US012238829B2

(12) United States Patent
Li et al.

(10) Patent No.: US 12,238,829 B2
(45) Date of Patent: Feb. 25, 2025

(54) DIMMING CONTROL SYSTEMS AND METHODS COMPATIBLE WITH BOTH ANALOG VOLTAGE SIGNALS AND PULSE-WIDTH-MODULATION SIGNALS

(71) Applicant: ON-BRIGHT ELECTRONICS (SHANGHAI) CO., LTD., Shanghai (CN)

(72) Inventors: Ke Li, Shanghai (CN); Zhuoyan Li, Shanghai (CN); Liqiang Zhu, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/742,284

(22) Filed: May 11, 2022

(65) Prior Publication Data

US 2022/0394828 A1 Dec. 8, 2022

(30) Foreign Application Priority Data

May 25, 2021 (CN) ........................ 202110570083.8

(51) Int. Cl.
*H05B 45/14* (2020.01)
*H05B 45/325* (2020.01)
*H05B 45/34* (2020.01)

(52) U.S. Cl.
CPC ........... *H05B 45/14* (2020.01); *H05B 45/325* (2020.01); *H05B 45/34* (2020.01)

(58) Field of Classification Search
CPC ........ H05B 45/14; H05B 45/32; H05B 45/34; H05B 45/325; H05B 47/10
See application file for complete search history.

(56) References Cited

U.S. PATENT DOCUMENTS

| | | | |
|---|---|---|---|
| 9,370,057 | B2 | 6/2016 | Saes et al. |
| 2013/0127371 | A1 | 5/2013 | Sarig et al. |

(Continued)

FOREIGN PATENT DOCUMENTS

| | | | |
|---|---|---|---|
| CN | 103167676 | A | 6/2013 |
| CN | 103957648 | A | 7/2014 |

(Continued)

OTHER PUBLICATIONS

Taiwan Intellectual Property Office, Office Action mailed Mar. 28, 2022, in Application No. 110136344.

(Continued)

*Primary Examiner* — Abdullah A Riyami
*Assistant Examiner* — Syed M Kaiser
(74) *Attorney, Agent, or Firm* — Faegre Drinker Biddle & Reath LLP

(57) ABSTRACT

System and method for dimming control. For example, the system for dimming control includes: a signal converter configured to receive a dimming signal and convert the dimming signal to a converted signal associated with a first duty cycle; and a current controller configured to receive the converted signal and determine a magnitude of a current that flows through one or more light sources based at least in part on the converted signal; wherein the signal converter is further configured to: receive an analog voltage signal as the dimming signal; and convert the analog voltage signal to the converted signal based at least in part on the analog voltage signal; wherein the signal converter is also further configured to: receive a pulse-width-modulation signal as the dimming signal; and convert the pulse-width-modulation signal to the converted signal based at least in part on the pulse-width-modulation signal.

32 Claims, 13 Drawing Sheets

(56) References Cited

U.S. PATENT DOCUMENTS

| | | | | |
|---|---|---|---|---|
| 2014/0042933 | A1* | 2/2014 | Livschitz | H05B 45/14 315/307 |
| 2014/0265922 | A1* | 9/2014 | Gilliom | H05B 45/14 315/297 |
| 2016/0057823 | A1 | 2/2016 | Pope et al. | |
| 2016/0255693 | A1* | 9/2016 | Wang | H05B 45/395 315/185 R |
| 2017/0339763 | A1* | 11/2017 | Huang | H05B 45/10 |
| 2018/0331628 | A1* | 11/2018 | Yu | H02M 3/33515 |
| 2019/0364625 | A1* | 11/2019 | Brower | G05F 1/577 |
| 2020/0118482 | A1* | 4/2020 | Jung | G09G 3/342 |

FOREIGN PATENT DOCUMENTS

| | | | | | |
|---|---|---|---|---|---|
| CN | 104170526 | A | | 11/2014 | |
| CN | 107426874 | A | | 12/2017 | |
| CN | 110225616 | A | | 9/2019 | |
| CN | 111148316 | A | * | 5/2020 | B60Q 1/00 |
| CN | 211237683 | U | | 8/2020 | |
| CN | 112333894 | A | | 2/2021 | |
| TW | 201830384 | A | | 8/2018 | |
| TW | M601945 | U | | 9/2020 | |

OTHER PUBLICATIONS

China Patent Office, Office Action mailed Oct. 13, 2023, in Application No. 202110570083.8.

* cited by examiner

DIMMING CONTROL SYSTEMS AND METHODS COMPATIBLE WITH BOTH ANALOG VOLTAGE SIGNALS AND PULSE-WIDTH-MODULATION SIGNALS

1. CROSS-REFERENCES TO RELATED APPLICATIONS

This application claims priority to Chinese Patent Application No. 202110570083.8, filed May 25, 2021, incorporated by reference herein for all purposes.

2. BACKGROUND OF THE INVENTION

Certain embodiments of the present invention are directed to circuits. More particularly, some embodiments of the invention provide dimming control systems and methods compatible with multiple types of dimming signals. Merely by way of example, some embodiments of the invention have been applied to dimming control systems and methods that are compatible with both analog voltage signals and pulse-width-modulation signals. But it would be recognized that the invention has a much broader range of applicability.

Conventional lighting systems often use different types of light sources. As an example, the light sources include an incandescent lamp and/or a light-emitting-diode (LED) lamp. The brightness of these light sources usually needs to be adjusted by dimming control systems. Some dimming control systems often receive analog voltage signals as dimming signals and use the magnitudes of the analog voltage signals to adjust the brightness of some light sources. Other dimming control systems usually receive pulse-width-modulation (PWM) signals as dimming signals and use the duty cycles of the PWM signals to adjust the brightness of other light sources.

The dimming control systems with the analog voltage signals and the dimming control systems with the PWM signals are often not compatible. For example, the dimming control systems with the analog voltage signals and the dimming control systems with the PWM signals usually require different interfaces. As an example, the dimming control systems with the analog voltage signals and the dimming control systems with the PWM signals often include different peripheral circuits.

Hence it is highly desirable to improve the techniques related to dimming control.

3. BRIEF SUMMARY OF THE INVENTION

Certain embodiments of the present invention are directed to circuits. More particularly, some embodiments of the invention provide dimming control systems and methods compatible with multiple types of dimming signals. Merely by way of example, some embodiments of the invention have been applied to dimming control systems and methods that are compatible with both analog voltage signals and pulse-width-modulation signals. But it would be recognized that the invention has a much broader range of applicability.

According to certain embodiments, a system for dimming control includes: a signal converter configured to receive a dimming signal and convert the dimming signal to a converted signal associated with a first duty cycle; and a current controller configured to receive the converted signal and determine a magnitude of a current that flows through one or more light sources based at least in part on the converted signal; wherein the signal converter is further configured to: receive an analog voltage signal as the dimming signal; and convert the analog voltage signal to the converted signal based at least in part on the analog voltage signal; wherein the signal converter is also further configured to: receive a pulse-width-modulation signal as the dimming signal; and convert the pulse-width-modulation signal to the converted signal based at least in part on the pulse-width-modulation signal; wherein the current controller is further configured to use the first duty cycle of the converted signal to determine the magnitude of the current that flows through the one or more light sources.

According to some embodiments, a method for dimming control includes: receiving a dimming signal; converting the dimming signal to a converted signal associated with a first duty cycle; receiving the converted signal; and determining a magnitude of a current that flows through one or more light sources based at least in part on the converted signal; wherein the receiving a dimming signal and the converting the dimming signal to a converted signal include: receiving an analog voltage signal as the dimming signal; and converting the analog voltage signal to the converted signal based at least in part on the analog voltage signal; wherein the receiving a dimming signal and the converting the dimming signal to a converted signal include: receiving a pulse-width-modulation signal as the dimming signal; and converting the pulse-width-modulation signal to the converted signal based at least in part on the pulse-width-modulation signal; wherein the determining a magnitude of a current that flows through one or more light sources includes: using the first duty cycle of the converted signal to determine the magnitude of the current that flows through the one or more light sources.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide dimming control systems and methods compatible with multiple types of dimming signals. Merely by way of example, some embodiments of the invention have been applied to dimming control systems and methods that are compatible with both analog voltage signals and pulse-width-modulation signals. But it would be recognized that the invention has a much broader range of applicability.

Figure 1:
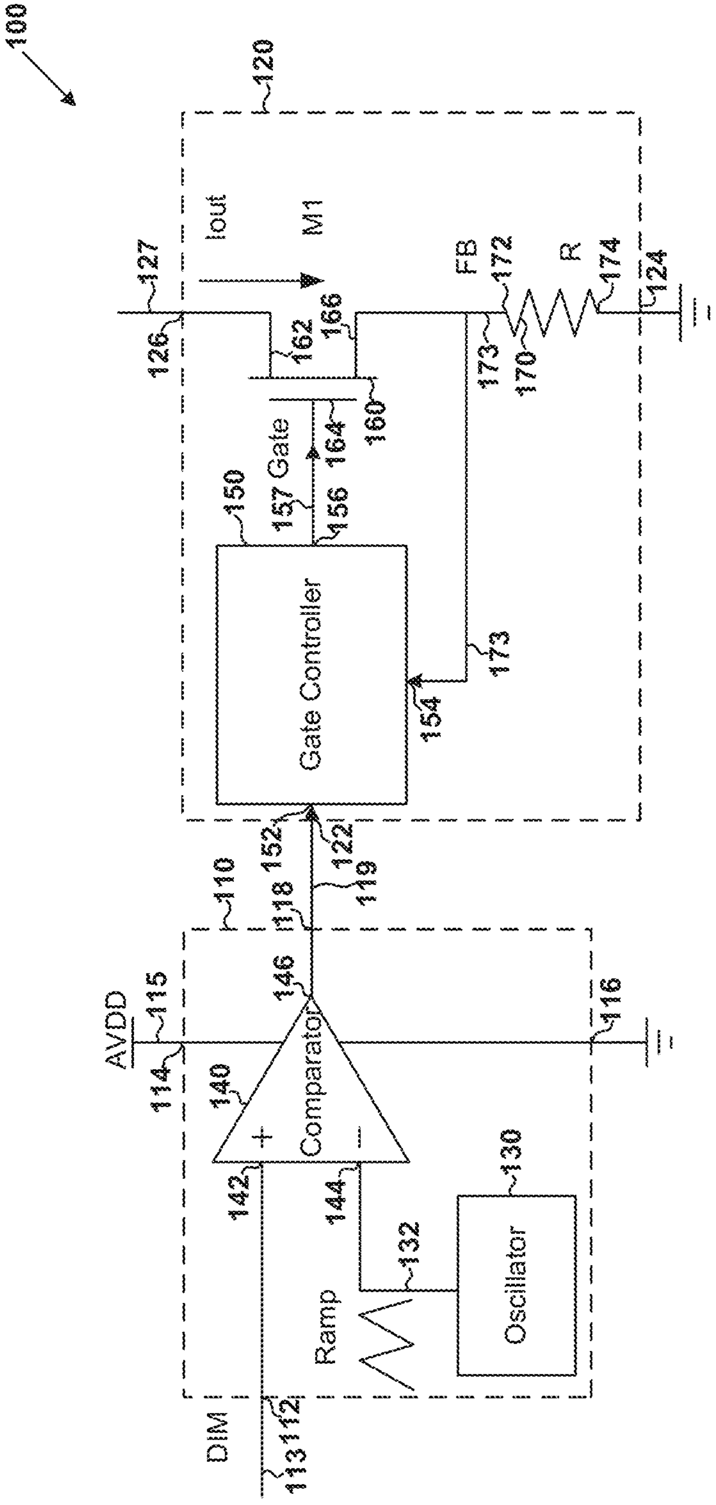
FIG. 1 is a simplified diagram showing a system for dimming control according to certain embodiments of the present invention.

FIG. 1 is a simplified diagram showing a system for dimming control according to certain embodiments of the present invention. This diagram is merely an example, which should not unduly limit the scope of the claims. One of ordinary skill in the art would recognize many variations, alternatives, and modifications. The system 100 for dimming control includes a signal converter 110 and a current controller 120. For example, the signal converter 110 includes an oscillator 130 and a comparator 140. As an example, the current controller 120 (e.g., a constant-current controller) includes a gate controller 150, a transistor 160, and a resistor 170. Although the above has been shown using a selected group of components for the system 100 for dimming control, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 1, the signal converter 110 includes terminals 112, 114, 116 and 118, and the current controller 120 includes terminals 122, 124 and 126 according to some embodiments. In certain examples, the terminal 112 of the signal converter 110 receives a dimming signal 113, the terminal 114 of the signal converter 110 receives a supply voltage 115, the terminal 116 of the signal converter 110 receives a ground voltage, and the terminal 118 of the signal converter 110 outputs a signal 119. For example, the dimming signal 113 is an analog voltage signal. As an example, the dimming signal 113 is a pulse-width-modulation (PWM) signal (e.g., a logic signal). In some examples, the terminal 122 of the current controller 120 receives the signal 119 from the terminal 118 of the signal converter 110, the terminal 124 of the current controller 120 is biased to the ground voltage, and the terminal 126 of the current controller 120 receives a current 127 that flows through one or more light sources. For example, the one or more light sources include one or more incandescent lamps. As an example, the one or more light sources include one or more light-emitting-diode (LED) lamps.

In certain embodiments, the signal converter 110 converts the dimming signal 113 to the signal 119. For example, the dimming signal 113 is the analog voltage signal and/or the pulse-width-modulation (PWM) signal. As an example, the signal converter 110 uses the dimming signal 113 to determine the duty cycle of the signal 119. For example, the signal converter 110 includes the oscillator 130 and the comparator 140. In some examples, the oscillator 130 generates a periodic signal 132 (e.g., a periodic signal with a constant period $T_1$). For example, the periodic signal 132 is a triangular-wave signal. As an example, the periodic signal 132 is a sawtooth-wave signal. In certain examples, the comparator 140 includes a non-inverting input terminal 142 (e.g., the "+" terminal), an inverting input terminal 144 (e.g., the "−" terminal), and an output terminal 146. For example, the non-inverting input terminal 142 (e.g., the "+" terminal) receives the dimming signal 113, and the inverting input terminal 144 (e.g., the "−" terminal) receives the periodic signal 132 from the oscillator 130.

In some embodiments, the comparator 140 compares the dimming signal 113 and the periodic signal 132, generates the signal 119 based at least in part on the dimming signal 113 and the periodic signal 132, and outputs the signal 119 at the output terminal 146. For example, regardless of whether the dimming signal 113 is an analog voltage signal or a pulse-width-modulation (PWM) signal, if the dimming signal 113 is larger than the periodic signal 132, the signal 119 is at a high voltage level. As an example, regardless of whether the dimming signal 113 is an analog voltage signal or a pulse-width-modulation (PWM) signal, if the dimming signal 113 is smaller than the periodic signal 132, the signal 119 is at a low voltage level. In certain examples, the signal 119 changes from the high voltage level to the low voltage level and changes from the low voltage level to the high voltage level. For example, the high voltage level is equal to the supply voltage 115 (e.g., AVDD) in magnitude, and the low voltage level is equal to the ground voltage (e.g., 0 volts) in magnitude. As an example, the high voltage level corresponds to a logic high level, and the low voltage level corresponds to a logic low level.

According to certain embodiments, the terminal 122 of the current controller 120 receives the signal 119 from the terminal 118 of the signal converter 110. In some examples, the current controller 120 uses a pulse-width-modulation mechanism, a pulse-frequency-modulation mechanism, and/or a liner control mechanism to control the magnitude of the current 127 that flows through the one or more light sources. For example, the current controller 120 uses the duty cycle of the signal 119 to control the magnitude of the current 127 that flows through the one or more light sources. As an example, by controlling the magnitude of the current 127, the current controller 120 also controls the brightness of the one or more light sources. In some examples, the one or more light sources are one or more incandescent lamps, and the brightness of the one or more incandescent lamps corresponds to the analog voltage signal 113. In certain examples, the one or more light sources are one or more light-emitting-diode (LED) lamps, and the brightness of the one or more light-emitting-diode (LED) lamps corresponds to the pulse-width-modulation (PWM) signal 113. In certain examples, the current controller 120 samples the duty cycle of the signal 119 and uses the sampled duty cycle to control the magnitude of the current 127 that flows through the one or more light sources. As an example, the current controller 120 provides a one-to-one correspondence between the duty cycle of the signal 119 and the current 127 that flows through the one or more light sources.

According to some embodiments, the current controller 120 includes the gate controller 150, the transistor 160, and the resistor 170. For example, the gate controller 150 includes an input terminal 152, an input terminal 154, and an output terminal 156. As an example, the transistor 160 includes a drain terminal 162, a gate terminal 164, and a source terminal 166. For example, the resistor 170 includes a terminal 172 and a terminal 174. In some examples, the drain terminal 162 of the transistor 160 receives the current 127 through the terminal 126 of the current controller 120, and the current 127 flows from the drain terminal 162 to the source terminal 166 of the transistor 160. For example, the source terminal 166 is connected to the terminal 172 of the resistor 170. As an example, the current 127 flows from the terminal 172 to the terminal 174 of the resistor 170, and the terminal 174 is biased to the ground voltage. In certain examples, the resistor 170 generates a sensing voltage 173 at the terminal 172. For example, the sensing voltage 173 is equal to the current 127 multiplied by the resistance of the resistor 170.

In certain embodiments, the input terminal 152 of the gate controller 150 receives the signal 119 through the terminal 122, and the input terminal 154 of the gate controller 150 receives the sensing voltage 173 from the terminal 172 of the resistor 170. For example, based at least in part on the signal 119 and the sensing voltage 173, the gate controller 150 generates a gate voltage 157 and outputs the gate voltage 157 at the output terminal 156. In some embodiments, the gate voltage 157 is received by the gate terminal 164 of the transistor 160. For example, the gate voltage 157 is used to control the magnitude of the current 127 that flows through the transistor 160. As an example, if the gate voltage 157 increases, the current 127 also increases, and if the gate voltage 157 decreases, the current 127 also decreases.

Figure 2:
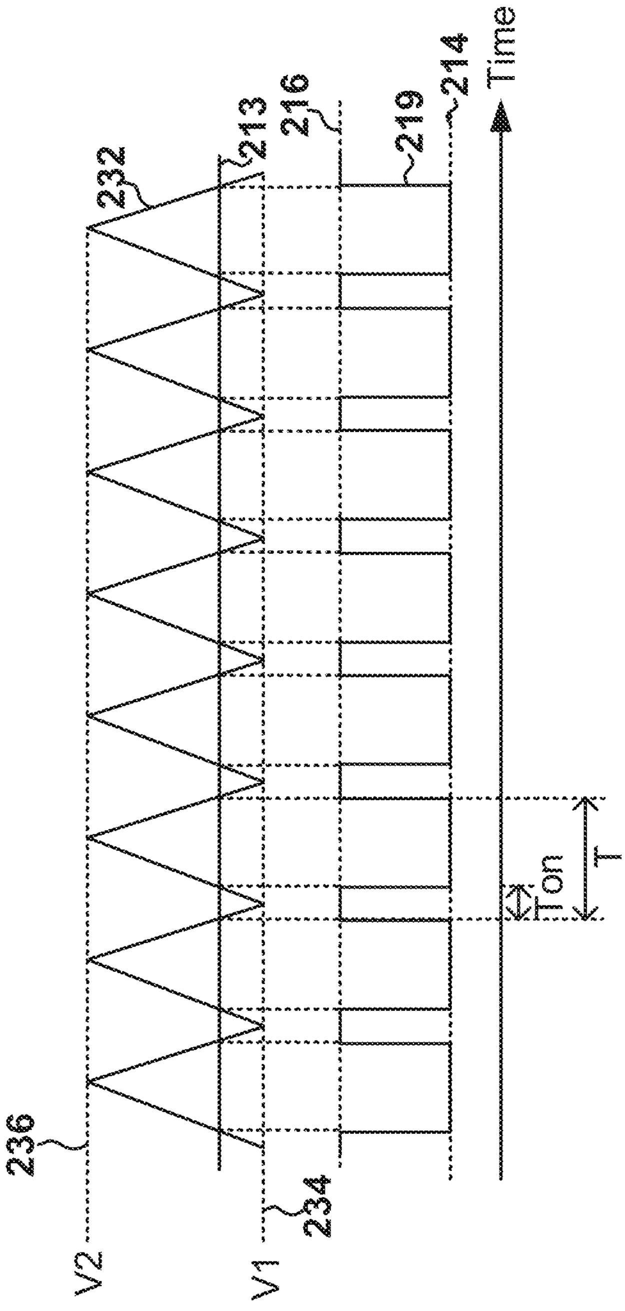
FIG. 2 shows simplified timing diagrams for the signal converter as part of the system for dimming control as shown in FIG. 1 according to some embodiments of the present invention.

FIG. 2 shows simplified timing diagrams for the signal converter 110 as part of the system 100 for dimming control as shown in FIG. 1 according to some embodiments of the present invention. These diagrams are merely examples, which should not unduly limit the scope of the claims. One of ordinary skill in the art would recognize many variations, alternatives, and modifications. For example, the waveform 213 represents the dimming signal 113 that is an analog voltage signal as a function of time, the waveform 232 represents the periodic signal 132 as a function of time, and the waveform 219 represents the signal 119 as a function of time.

In certain examples, the periodic signal 132 changes between a valley voltage level 234 (e.g., $V_1$) and a peak voltage level 236 (e.g., $V_2$) as shown by the waveform 232. For example, the periodic signal 132 is a triangular-wave signal. As an example, different magnitudes of the analog voltage signal 113 correspond to different magnitudes of the current 127 respectively. In some examples, the magnitude of the analog voltage signal 113 changes between a lower voltage limit (e.g., 0 volts) and an upper voltage limit (e.g., $V_H$). For example, the lower voltage limit (e.g., 0 volts) is smaller than or equal to the valley voltage level 234 (e.g., $V_1$) of the periodic signal 132. As an example, the upper voltage limit (e.g., $V_H$) is larger than or equal to the peak voltage level 236 (e.g., $V_2$) of the periodic signal 132.

According to certain embodiments, the signal converter 110 compares the periodic signal 132 with the analog voltage signal 113 to generate the signal 119. In some examples, the signal 119 changes between a low voltage level 214 and a high voltage level 216 as shown by the waveform 219. As an example, if the analog voltage signal 113 is larger than the periodic signal 132, the signal 119 is at the high voltage level 216. For example, if the analog voltage signal 113 is smaller than the periodic signal 132, the signal 119 is at the low voltage level 214.

In some embodiments, the signal converter 110 converts the analog voltage signal 113 to the signal 119. For example, as shown in FIG. 2, the signal 119 has a duty cycle that is equal to $T_{on}$ divided by T, where T represents a period of the signal 119 and $T_{on}$ represents a time duration during which the signal 119 is at the high voltage level 216 within the period of the signal 119. In certain examples, if the magnitude of the analog voltage signal 113 is smaller than the valley voltage level 234 (e.g., $V_1$) of the periodic signal 132, the signal 119 remains at the low voltage level 214 and has a duty cycle equal to zero. In some examples, if the magnitude of the analog voltage signal 113 is larger than the peak voltage level 236 (e.g., $V_2$) of the periodic signal 132, the signal 119 remains at the high voltage level 216 and has a duty cycle equal to one.

In certain embodiments, if the magnitude of the analog voltage signal 113 is larger than the valley voltage level 234 (e.g., $V_1$) of the periodic signal 132 and is smaller than the peak voltage level 236 (e.g., $V_2$) of the periodic signal 132, the signal 119 changes between the low voltage level 214 and the high voltage level 216 and has a duty cycle larger than 0 and smaller than 1. For example, if the voltage magnitude of the analog voltage signal 113 is larger than the valley voltage level 234 (e.g., $V_1$) of the periodic signal 132 and is smaller than the peak voltage level 236 (e.g., $V_2$) of the periodic signal 132, the duty cycle of the signal 119 is determined as follows:

$$D_{119} = \frac{V_{DIM} - V_1}{V_2 - V_1} \qquad \text{(Equation 1)}$$

where $D_{119}$ represents the duty cycle of the signal 119, and $V_{DIM}$ represents the magnitude of the analog voltage signal 113. Additionally, $V_1$ represents the valley voltage level 234 of the periodic signal 132, and $V_2$ represents the peak voltage level 236 of the periodic signal 132.

In some examples, as shown in Equation 1, if the constant voltage magnitude $V_{DIM}$ of the analog voltage signal 113 is larger than the valley voltage level $V_1$ of the periodic signal 132 and is smaller than the peak voltage level $V_2$ of the periodic signal 132, the constant voltage magnitude $V_{DIM}$ has a one-to-one correspondence with the duty cycle $D_{119}$ of the signal 119. In certain example, Equation 1 is valid for any magnitude of the analog voltage signal 113 that is larger than or equal to the valley voltage level 234 (e.g., $V_1$) of the periodic signal 132 and smaller than or equal to the peak voltage level 236 (e.g., $V_2$) of the periodic signal 132. For example, if the magnitude of the analog voltage signal 113 is equal to the valley voltage level 234 (e.g., $V_1$) of the periodic signal 132, the duty cycle of the signal 119 is equal to zero. As an example, if the magnitude of the analog voltage signal 113 is equal to the peak voltage level 236 (e.g., $V_2$) of the periodic signal 132, the duty cycle of the signal 119 is equal to one.

In certain examples, as shown by the waveform 213, the analog voltage signal 113 remains at a constant voltage magnitude that does not change with time. For example, the constant voltage magnitude is larger than or equal to the lower voltage limit (e.g., 0 volts) and is smaller than or equal to the upper voltage limit (e.g., $V_H$). As an example, the constant voltage magnitude of the analog voltage signal 113 corresponds to a constant duty cycle $D_{119}$ of the signal 119 as shown by the waveform 219.

Figure 3:
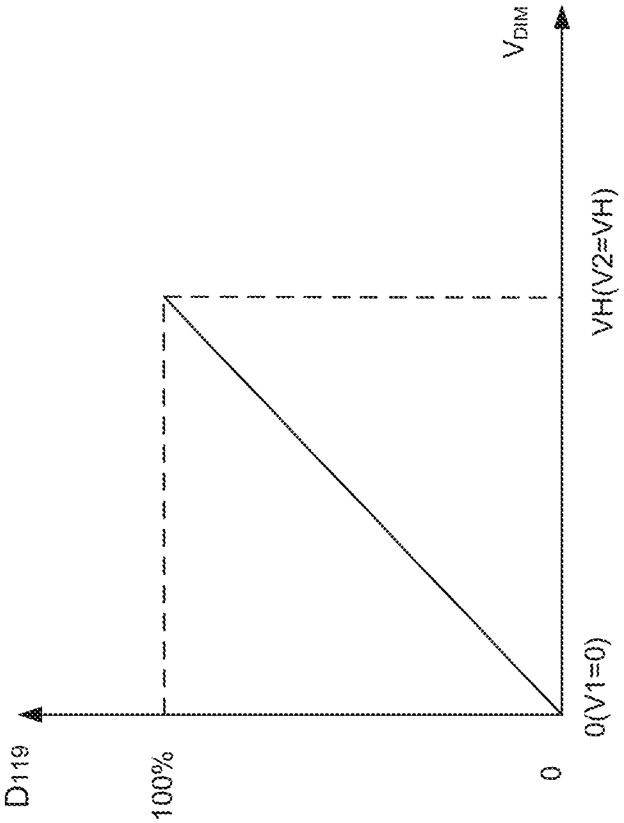
FIG. 3 shows a simplified diagram for the duty cycle of the signal as a function of the magnitude of the analog voltage signal related to the signal converter as part of the system for dimming control as shown in FIG. 1 according to certain embodiments of the present invention.

FIG. 3 shows a simplified diagram for the duty cycle of the signal 119 as a function of the magnitude of the analog voltage signal 113 related to the signal converter 110 as part of the system 100 for dimming control as shown in FIG. 1 according to certain embodiments of the present invention. This diagram is merely an example, which should not unduly limit the scope of the claims. One of ordinary skill in the art would recognize many variations, alternatives, and modifications. For example, the magnitude (e.g., $V_{DIM}$) of the analog voltage signal 113 changes from the lower voltage limit 0 volts to the upper voltage limit $V_H$. As an example, the valley voltage level $V_1$ of the periodic signal 132 is equal to 0 volts, and the peak voltage level $V_2$ of the periodic signal 132 is equal to $V_H$.

As shown in FIG. 3, the duty cycle $D_{119}$ of the signal 119 increases linearly with the increasing magnitude of the analog voltage signal 113 according to some embodiments. For example, if the magnitude (e.g., $V_{DIM}$) of the analog voltage signal 113 is equal to 0 volts, which is also equal to the valley voltage level $V_1$ of the periodic signal 132, the duty cycle $D_{119}$ of the signal 119 is equal to zero according to Equation 1. As an example, if the magnitude (e.g., $V_{DIM}$) of the analog voltage signal 113 is equal to $V_H$, which is also equal to the peak voltage level $V_2$ of the periodic signal 132, the duty cycle $D_{119}$ of the signal 119 is equal to one according to Equation 1. In certain examples, when the magnitude (e.g., $V_{DIM}$) of the analog voltage signal 113 increases from 0 volts to $V_H$, the duty cycle $D_{119}$ of the signal 119 increases from 0 to 1 linearly as a function of the magnitude (e.g., $V_{DIM}$) of the analog voltage signal 113 according to Equation 1.

Figure 4:
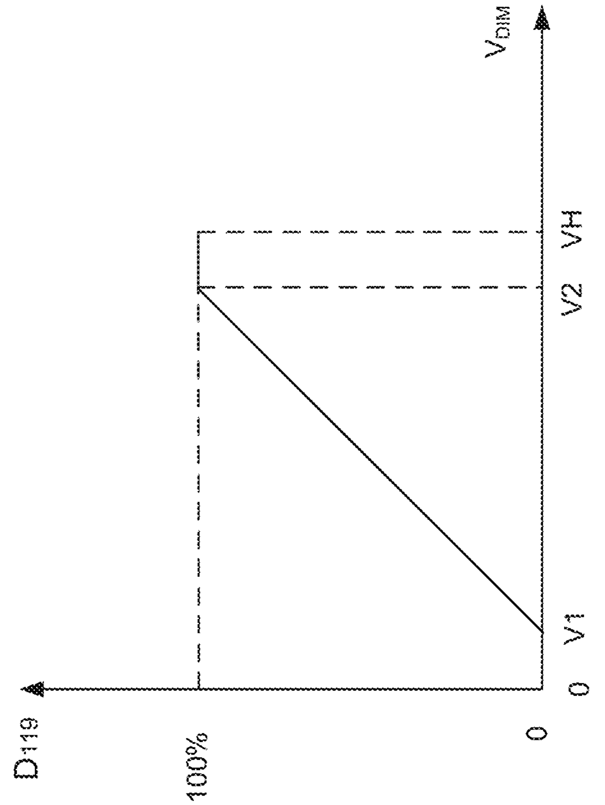
FIG. 4 shows a simplified diagram for the duty cycle of the signal as a function of the magnitude of the analog voltage signal related to the signal converter as part of the system for dimming control as shown in FIG. 1 according to some embodiments of the present invention.

FIG. 4 shows a simplified diagram for the duty cycle of the signal 119 as a function of the magnitude of the analog voltage signal 113 related to the signal converter 110 as part of the system 100 for dimming control as shown in FIG. 1 according to some embodiments of the present invention. This diagram is merely an example, which should not unduly limit the scope of the claims. One of ordinary skill in the art would recognize many variations, alternatives, and modifications. For example, the magnitude (e.g., $V_{DIM}$) of the analog voltage signal 113 changes from the lower voltage limit 0 volts to the upper voltage limit $V_H$. As an example, the valley voltage level $V_1$ of the periodic signal 132 is larger than 0 volts, and the peak voltage level $V_2$ of the periodic signal 132 is smaller than $V_H$.

For example, if the magnitude (e.g., $V_{DIM}$) of the analog voltage signal 113 is larger than or equal to 0 volts and smaller than or equal to the valley voltage level $V_1$ of the periodic signal 132, the duty cycle $D_{119}$ of the signal 119 is equal to zero. As an example, if the magnitude (e.g., $V_{DIM}$) of the analog voltage signal 113 is larger than or equal to the peak voltage level $V_2$ of the periodic signal 132 and smaller than or equal to $V_H$, the duty cycle $D_{119}$ of the signal 119 is equal to one. As shown in FIG. 3, when the magnitude (e.g., $V_{DIM}$) of the analog voltage signal 113 increases from the valley voltage level $V_1$ to the peak voltage level $V_2$, the duty cycle $D_{119}$ of the signal 119 increases from 0 to 1 linearly as a function of the magnitude (e.g., $V_{DIM}$) of the analog voltage signal 113 according to certain embodiments.

Figure 5:
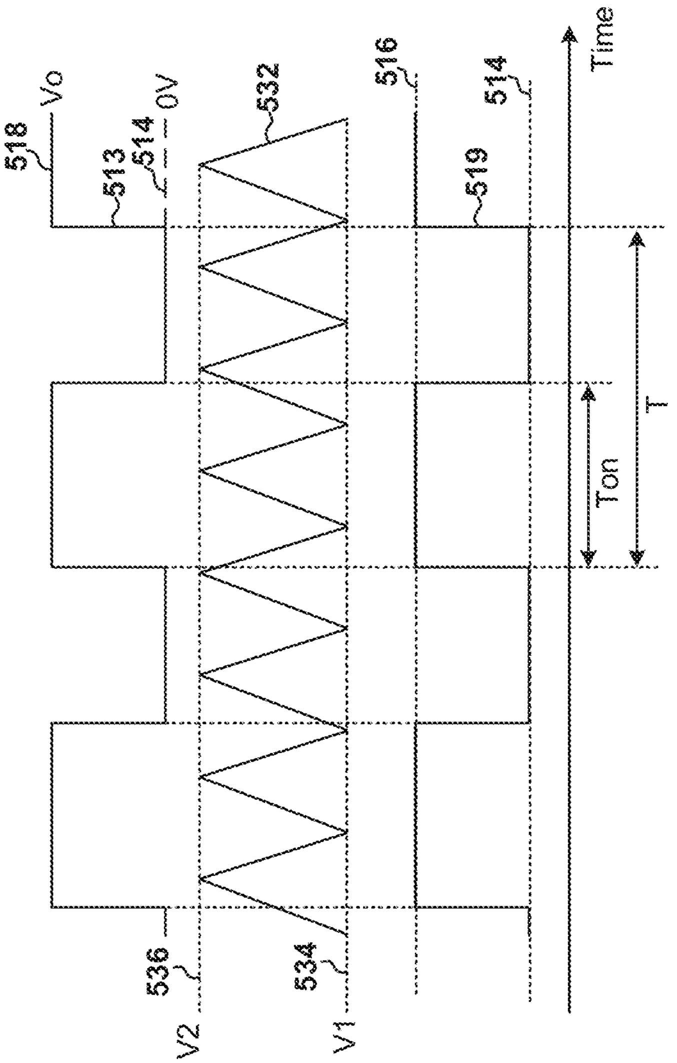
FIG. 5 shows simplified timing diagrams for the signal converter as part of the system for dimming control as shown in FIG. 1 according to certain embodiments of the present invention.

FIG. 5 shows simplified timing diagrams for the signal converter 110 as part of the system 100 for dimming control as shown in FIG. 1 according to certain embodiments of the present invention. These diagrams are merely examples, which should not unduly limit the scope of the claims. One of ordinary skill in the art would recognize many variations, alternatives, and modifications. For example, the waveform 513 represents the dimming signal 113 that is a pulse-width-modulation (PWM) signal as a function of time, the waveform 532 represents the periodic signal 132 as a function of time, and the waveform 519 represents the signal 119 as a function of time.

In certain examples, the periodic signal 132 changes between a valley voltage level 534 (e.g., $V_1$) and a peak voltage level 536 (e.g., $V_2$) as shown by the waveform 532. For example, the periodic signal 132 is a triangular-wave signal. In some examples, the pulse-width-modulation (PWM) signal 113 changes between a low voltage level 514 (e.g., 0 volts) and a high voltage level 518 (e.g., $V_O$). For example, the low voltage level 514 (e.g., 0 volts) is smaller than or equal to the valley voltage level 534 (e.g., $V_1$). As an example, the high voltage level 518 (e.g., $V_O$) is larger than or equal to the peak voltage level 536 (e.g., $V_2$). In certain examples, the duty cycle of the pulse-width-modulation (PWM) signal 113 changes between 0 and 1. For example, different magnitudes of the duty cycle for the pulse-width-modulation (PWM) signal 113 correspond to different magnitudes of the current 127 respectively.

According to some embodiments, the signal converter 110 compares the periodic signal 132 with the pulse-width-modulation (PWM) signal 113 to generate the signal 119. In some examples, the signal 119 changes between a low voltage level 514 and a high voltage level 516 as shown by the waveform 519. For example, if the pulse-width-modulation (PWM) signal 113 is larger than the periodic signal 132, the signal 119 is at the high voltage level 516. As an example, if the pulse-width-modulation (PWM) signal 113 is smaller than the periodic signal 132, the signal 119 is at the low voltage level 514. In certain examples, the high voltage level 518 (e.g., $V_O$) of the pulse-width-modulation (PWM) signal 113 is equal to or different from the high voltage level 516 of the signal 119.

According to certain embodiments, the low voltage level 514 is the same as the low voltage level 214, and the high voltage level 516 is the same as the high voltage level 216. For example, both the low voltage level 214 and the same as the low voltage level 514 are equal to the ground voltage (e.g., 0 volts) in magnitude. As an example, the high voltage level 216 and the high voltage level 516 are equal to the supply voltage 115 (e.g., AVDD) in magnitude.

In some embodiments, the signal converter 110 converts the analog voltage signal 113 to the signal 119. For example, if the pulse-width-modulation (PWM) signal 113 is at the high voltage level (e.g., $V_O$), which is larger than the peak voltage level 536 (e.g., $V_2$), the pulse-width-modulation (PWM) signal 113 is larger than the periodic signal 132 and the signal 119 is at the high voltage level 516. As an example, if the pulse-width-modulation (PWM) signal 113 is at the low voltage level 514 (e.g., 0 volts), which is smaller than the valley voltage level 534 (e.g., $V_{DIM}$), the pulse-width-modulation (PWM) signal 113 is smaller than the periodic signal 132 and the signal 119 is at the low voltage level 514.

In certain embodiments, the duty cycle of the signal 119 is equal to the duty cycle of the pulse-width-modulation (PWM) signal 113 as shown by the waveform 519 and the waveform 513. For example, the duty cycle of the pulse-width-modulation (PWM) signal 113 has a one-to-one correspondence with the duty cycle of the signal 119. In some examples, as shown by the waveform 513, the pulse-width-modulation (PWM) signal 113 has a duty cycle that is equal to $T_{on}$ divided by T, where T represents a period of the pulse-width-modulation (PWM) signal 113 and $T_{on}$ represents a time duration during which the pulse-width-modulation (PWM) signal 113 is at the high voltage level 518 (e.g., $V_O$) within the period of the pulse-width-modulation (PWM) signal 113. In certain examples, as shown by the waveform 519, the signal 119 has a duty cycle that is equal to $T_{on}$ divided by T, where T represents a period of the signal 119 and $T_{on}$ represents a time duration during which the signal 119 is at the high voltage level 516 within the period of the signal 119.

Figure 6:
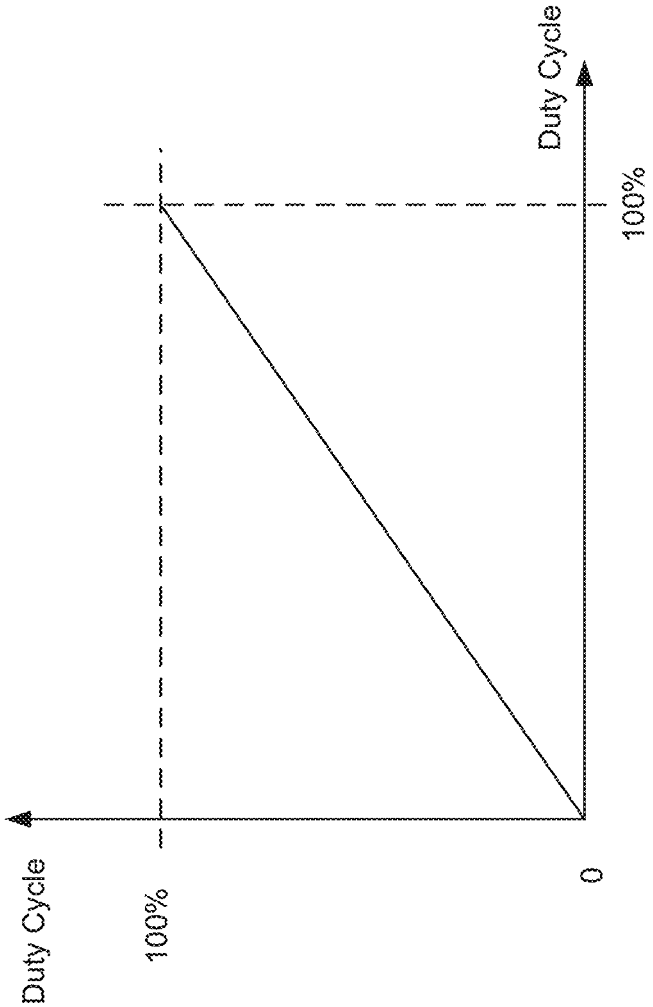
FIG. 6 shows a simplified diagram for the duty cycle of the signal as a function of the duty cycle of the pulse-width-modulation (PWM) signal related to the signal converter as part of the system for dimming control as shown in FIG. 1 according to certain embodiments of the present invention.

FIG. 6 shows a simplified diagram for the duty cycle of the signal 119 as a function of the duty cycle of the pulse-width-modulation (PWM) signal 113 related to the signal converter 110 as part of the system 100 for dimming control as shown in FIG. 1 according to certain embodiments of the present invention. This diagram is merely an example, which should not unduly limit the scope of the claims. One of ordinary skill in the art would recognize many variations, alternatives, and modifications.

In certain examples, the periodic signal 132 changes between a valley voltage level $V_1$ and a peak voltage level $V_2$, and the pulse-width-modulation (PWM) signal 113 changes from a low voltage level 0 volts to a high voltage level $V_O$. For example, the low voltage level 0 volts is smaller than the valley voltage level $V_1$. As an example, the high voltage level $V_O$ is larger than the peak voltage level $V_2$. In some examples, the duty cycle of the pulse-width-modulation (PWM) signal 113 changes between 0 and 1. For example, different magnitudes of the duty cycle for the pulse-width-modulation (PWM) signal 113 correspond to different magnitudes of the current 127 respectively.

As shown in FIG. 6, when the duty cycle of the pulse-width-modulation (PWM) signal 113 increases from 0 and 1, the duty cycle of the signal 119 increases from 0 to 1 linearly as a function of the duty cycle of the pulse-width-modulation (PWM) signal 113, according to some embodiments. For example, the duty cycle of the signal 119 is equal to the duty cycle of the pulse-width-modulation (PWM) signal 113.

Figure 7:
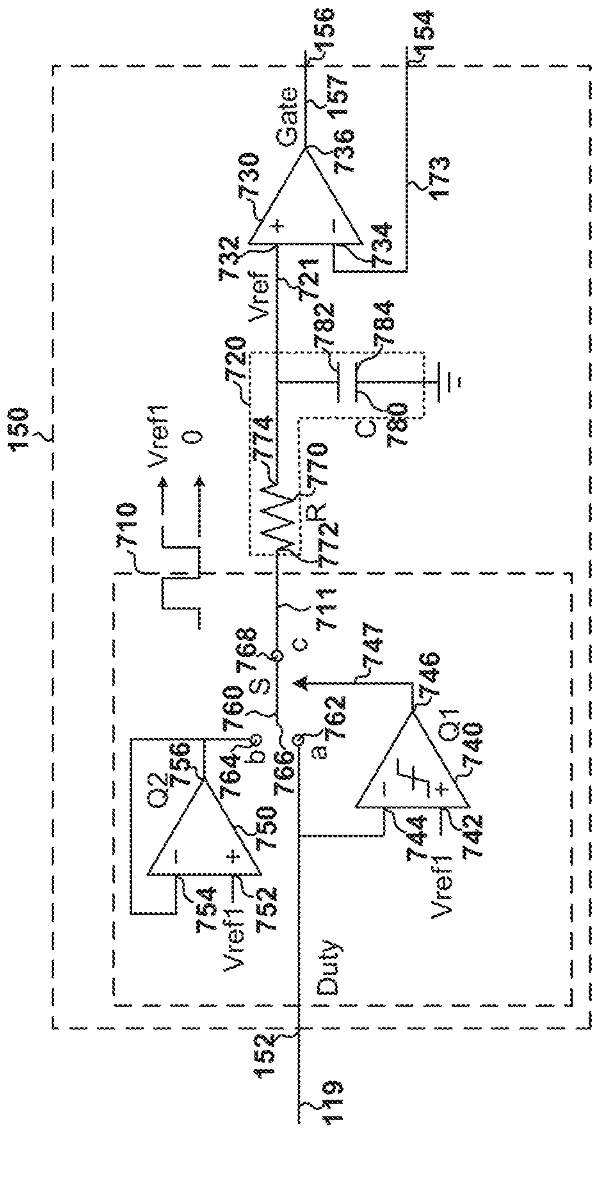
FIG. 7 is a simplified diagram showing the gate controller of the constant-current controller as part of the system for dimming control as shown in FIG. 1 according to certain embodiments of the present invention.

FIG. 7 is a simplified diagram showing the gate controller 150 of the current controller 120 as part of the system 100 for dimming control as shown in FIG. 1 according to certain embodiments of the present invention. This diagram is merely an example, which should not unduly limit the scope of the claims. One of ordinary skill in the art would recognize many variations, alternatives, and modifications. The gate controller 150 includes a voltage-level conversion circuit 710, a filtering circuit 720, and an operational amplifier 730. For example, the voltage-level conversion circuit 710 includes a comparator 740, a buffer 750, and a switch 760. As an example, the filtering circuit 720 includes a resistor 770 and a capacitor 780. Although the above has been shown using a selected group of components for the gate controller 150, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the voltage-level conversion circuit 710 receives the signal 119 and generates a signal 711 based at least in part on the signal 119, wherein the signal 119 changes between a high voltage level and a low voltage level and the signal 711 changes between another high voltage level and the same low voltage level. For example, the high voltage level of the signal 119 is equal to the supply voltage 115 (e.g., AVDD), and the low voltage level of the signal 119 is equal to the ground voltage (e.g., 0 volts). As an example, the high voltage level of the signal 711 is equal to a predetermined reference voltage (e.g., $V_{ref1}$), and the low voltage level of the signal 711 is equal to the ground voltage (e.g., 0 volts), wherein the predetermined reference voltage (e.g., $V_{ref1}$) is different from (e.g., smaller than) the supply voltage 115 (e.g., AVDD). In certain examples, if the signal 119 is at the supply voltage 115 (e.g., AVDD), the signal 711 is at the predetermined reference voltage (e.g., $V_{ref1}$), wherein the supply voltage 115 (e.g., AVDD) and the predetermined reference voltage (e.g., $V_{ref1}$) are not equal. In some examples, if the signal 119 is at the ground voltage (e.g., 0 volts), the signal 711 is also at the ground voltage (e.g., 0 volts). For example, the signal 119 and the signal 711 have the same frequency and the same phase. As an example, the signal 119 and the signal 711 have the same duty cycle.

In certain embodiments, the predetermined reference voltage (e.g., $V_{ref1}$) of the signal 711 is smaller than the supply voltage 115 (e.g., AVDD) of the signal 119. For example, if the signal 119 is smaller than the predetermined reference voltage (e.g., $V_{ref1}$), the voltage-level conversion circuit 710 generates the signal 711 at the ground voltage (e.g., 0 volts). As an example, if the signal 119 is larger than the predetermined reference voltage (e.g., $V_{ref1}$), the voltage-level conversion circuit 710 generates the signal 711 at the predetermined reference voltage (e.g., $V_{ref1}$).

As shown in FIG. 7, the voltage-level conversion circuit 710 includes the comparator 740, the buffer 750, and the switch 760 according to some embodiments. For example, the comparator 740 includes a non-inverting input terminal 742 (e.g., the "+" terminal), an inverting input terminal 744 (e.g., the "−" terminal), and an output terminal 746. As an example, the buffer 750 includes a non-inverting input terminal 752 (e.g., the "+" terminal), an inverting input terminal 754 (e.g., the "−" terminal), and an output terminal 756. In certain examples, the non-inverting input terminal 742 (e.g., the "+" terminal) of the comparator 740 receives the predetermined reference voltage (e.g., $V_{ref1}$), and the inverting input terminal 744 (e.g., the "−" terminal) of the comparator 740 receives the signal 119. For example, the comparator 740 compares the predetermined reference voltage (e.g., $V_{ref1}$) and the signal 119 and generates a comparison signal 747 at the output terminal 756. As an example, the comparison signal 747 is used to control the switch 760. In some examples, the non-inverting input terminal 752 (e.g., the "+" terminal) of the buffer 750 receives the predetermined reference voltage (e.g., $V_{ref1}$), and the inverting input terminal 754 (e.g., the "−" terminal) of the buffer 750 is connected to the output terminal 756 of the buffer 750. For example, the output terminal 756 of the buffer 750 is biased at the predetermined reference voltage (e.g., $V_{ref1}$).

According to certain embodiments, the switch 760 includes terminals 766 and 768. For example, the terminal 768 is connected to a terminal 772 of the resistor 770. As an example, the terminal 768 is connected to a terminal 762 or a terminal 764. For example, if the comparison signal 747 is at a logic high level, the terminal 768 is connected to the terminal 762, and the signal 711 is equal to the signal 119. As an example, if the comparison signal 747 is at a logic low level, the terminal 768 is connected to the terminal 764, which is connected to the inverting input terminal 754 (e.g., the "−" terminal) and the output terminal 756 of the buffer 750, and the signal 711 is equal to the predetermined reference voltage (e.g., $V_{ref1}$). In some examples, if the signal 119 is at the ground voltage (e.g., 0 volts), the comparison signal 747 is at the logic high level, so that the terminal 768 is connected to the terminal 762 and the signal 711 is also at the ground voltage (e.g., 0 volts). In certain examples, if the signal 119 is at the supply voltage 115 (e.g., AVDD), the comparison signal 747 is at the logic low level, so that the terminal 768 is connected to the terminal 764 and the signal 711 is equal to the predetermined reference voltage (e.g., $V_{ref1}$).

In some embodiments, the filtering circuit 720 receives the signal 711 and generates a filtered signal 721 based at least in part on the signal 711. For example, the filtering circuit 720 performs filtering on the signal 711 to generate the filtered signal 721. As an example, the filtering circuit 720 outputs the filtered signal 721 to the operational amplifier 730. In certain examples, the filtering circuit 720 is an RC filtering circuit that includes the resistor 770 and the capacitor 780. For example, the resistor 770 includes terminals 772 and 774. As an example, the capacitor 780 includes terminals 782 and 784. In some examples, the terminal 774 of the resistor 770 is connected to the terminal 782 of the capacitor 780, and the terminal 784 of the capacitor 780 is biased to the ground voltage (e.g., 0 volts). For example, the terminal 772 of the resistor 770 receives the signal 711. As an example, the terminal 774 of the resistor 770 and the terminal 782 of the capacitor 780 are biased to the filtered signal 721.

In certain embodiments, the filtered signal 721 is determined by the duty cycle of the signal 711 and the high voltage level of the signal 711. For example, the duty cycle of the signal 711 is equal to the duty cycle of the signal 119, and the high voltage level of the signal 711 is equal to the predetermined reference voltage (e.g., $V_{ref1}$). In some examples, the filtered signal 721 is determined as follows:

$$V_{721}=V_{ref1}\times D_{119} \quad \text{(Equation 2)}$$

where $V_{721}$ represents the filtered signal 721, and $D_{119}$ represents the duty cycle of the signal 119. Additionally, $V_{ref1}$ represents the predetermined reference voltage, which is received by the non-inverting input terminal 742 (e.g., the "+" terminal) of the comparator 740 and the non-inverting input terminal 752 (e.g., the "+" terminal) of the buffer 750. For example, as shown by Equation 2, if the duty cycle of the signal 119 is equal to one, the filtered signal 721 is equal to the predetermined reference voltage $V_{ref1}$.

In some examples, according to Equation 2, the filtered signal 721 depends on the duty cycle of the signal 119. For example, if the dimming signal 113 is an analog voltage signal, the duty cycle of the signal 119 depends on the magnitude of the analog voltage signal 113, and if the dimming signal 113 is a pulse-width-modulation (PWM) signal, the duty cycle of the signal 119 depends on the duty cycle of the pulse-width-modulation (PWM) signal 113. As an example, if the dimming signal 113 is an analog voltage signal, the filtered signal 721 depends on the magnitude of the analog voltage signal 113, and if the dimming signal 113 is a pulse-width-modulation (PWM) signal, the filtered signal 721 depends on the duty cycle of the pulse-width-modulation (PWM) signal 113.

According to some embodiments, if the dimming signal 113 is an analog voltage signal, the filtered signal 721 depends on the magnitude of the analog voltage signal 113. For example, if the magnitude of the analog voltage signal 113 is smaller than the valley voltage level 234 (e.g., $V_1$) of the periodic signal 132, the signal 119 has a duty cycle equal to zero and the filtered signal 721 is equal to zero according to Equation 2. As an example, if the magnitude of the analog voltage signal 113 is larger than the peak voltage level 236 (e.g., $V_2$) of the periodic signal 132, the signal 119 has a duty cycle equal to one and the filtered signal 721 is equal to the predetermined reference voltage $V_{ref1}$ according to Equation 2. For example, if the magnitude of the analog voltage signal 113 is larger than the valley voltage level 234 (e.g., $V_1$) of the periodic signal 132 and is smaller than the peak voltage level 236 (e.g., $V_2$) of the periodic signal 132, the filtered signal 721 is determined as follows:

$$V_{721} = V_{ref1} \times \frac{V_{DIM} - V_1}{V_2 - V_1} \quad \text{(Equation 3)}$$

Where $V_{721}$ represents the filtered signal 721, and $V_{ref1}$ represents the predetermined reference voltage, which is received by the non-inverting input terminal 742 (e.g., the "+" terminal) of the comparator 740 and the non-inverting input terminal 752 (e.g., the "+" terminal) of the buffer 750. Additionally, $V_{DIM}$ represents the magnitude of the analog voltage signal 113. Also, $V_1$ represents the valley voltage level 234 of the periodic signal 132, and $V_2$ represents the peak voltage level 236 of the periodic signal 132.

In some examples, as shown in Equation 3, if the voltage magnitude $V_{DIM}$ of the analog voltage signal 113 is larger than the valley voltage level $V_1$ of the periodic signal 132 and is smaller than the peak voltage level $V_2$ of the periodic signal 132, the voltage magnitude $V_{DIM}$ has a one-to-one correspondence with the filtered signal 721. In certain example, Equation 3 is valid for any magnitude of the analog voltage signal 113 that is larger than or equal to the valley voltage level 234 (e.g., $V_1$) of the periodic signal 132 and smaller than or equal to the peak voltage level 236 (e.g., $V_2$) of the periodic signal 132. For example, if the magnitude of the analog voltage signal 113 is equal to the valley voltage level 234 (e.g., $V_1$) of the periodic signal 132, the filtered signal 721 is equal to zero. As an example, if the magnitude of the analog voltage signal 113 is equal to the peak voltage level 236 (e.g., $V_2$) of the periodic signal 132, the filtered signal 721 is equal to the predetermined reference voltage $V_{ref1}$.

According to certain embodiments, if the dimming signal 113 is a pulse-width-modulation (PWM) signal, the filtered signal 721 depends on the duty cycle of the pulse-width-modulation (PWM) signal 113. For example, the filtered signal 721 is determined as follows:

$$V_{721}=V_{ref1}\times D_{113} \quad \text{(Equation 4)}$$

where $V_{721}$ represents the filtered signal 721, and $D_{113}$ represents the duty cycle of the pulse-width-modulation (PWM) signal 113. Additionally, $V_{ref1}$ represents the predetermined reference voltage, which is received by the non-inverting input terminal 742 (e.g., the "+" terminal) of the comparator 740 and the non-inverting input terminal 752 (e.g., the "+" terminal) of the buffer 750.

In some embodiments, the operational amplifier 730 includes a non-inverting input terminal 732 (e.g., the "+" terminal), an inverting input terminal 734 (e.g., the "−" terminal), and an output terminal 736. For example, the non-inverting input terminal 732 (e.g., the "+" terminal) receives the filtered signal 721. As an example, the inverting input terminal 734 (e.g., the "−" terminal) receives the sensing voltage 173, which indicates the magnitude of the current 127. In some examples, the operational amplifier 730 generates the gate voltage 157 and outputs the gate voltage 157 at the output terminal 736. For example, the gate voltage 157 is received by the gate terminal 164 of the transistor 160 and used to control the magnitude of the current 127 that flows through the transistor 160. As an example, if the gate voltage 157 increases, the current 127 also increases, and if the gate voltage 157 decreases, the current 127 also decreases. In certain embodiments, the current controller 120 that includes the gate controller 150 as shown in FIG. 7 uses the liner control mechanism to control the magnitude of the current 127 that flows through the one or more light sources.

Figure 8:
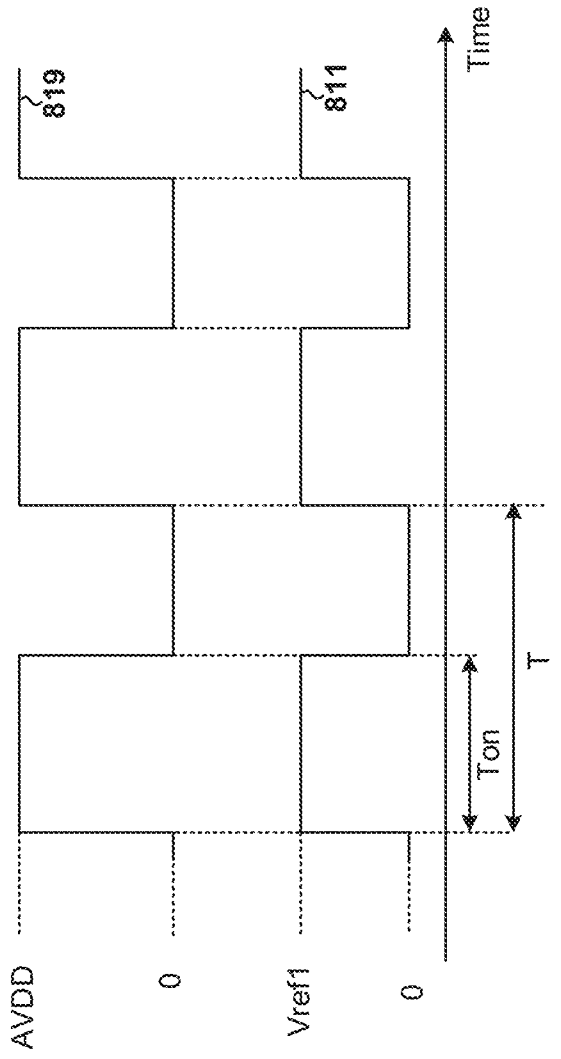
FIG. 8 shows simplified timing diagrams for the voltage-level conversion circuit of the gate controller as shown in FIG. 7 as part of the constant-current controller of the system for dimming control as shown in FIG. 1 according to some embodiments of the present invention.

FIG. 8 shows simplified timing diagrams for the voltage-level conversion circuit 710 of the gate controller 150 as shown in FIG. 7 as part of the current controller 120 of the system 100 for dimming control as shown in FIG. 1 according to some embodiments of the present invention. These diagrams are merely examples, which should not unduly limit the scope of the claims. One of ordinary skill in the art would recognize many variations, alternatives, and modifications. For example, the waveform 819 represents the signal 119 as a function of time, and the waveform 811 represents the signal 711 as a function of time.

According to certain embodiments, the signal 119 changes between the supply voltage 115 (e.g., AVDD) and the ground voltage (e.g., 0 volts) as shown by the waveform 819, and the signal 711 changes between the predetermined reference voltage (e.g., $V_{ref1}$) and the ground voltage (e.g., 0 volts) as shown by the waveform 811. In some examples, the supply voltage 115 (e.g., AVDD) is larger than the predetermined reference voltage (e.g., $V_{ref1}$). In certain examples, the signal 119 and the signal 711 have the same frequency and the same phase. As an example, the signal 119 and the signal 711 have the same duty cycle.

In some embodiments, as shown by the waveform 819, the signal 119 has a duty cycle that is equal to $T_{on}$ divided by T, where T represents a period of the signal 119 and $T_{on}$ represents a time duration during which the signal 119 is at the supply voltage 115 (e.g., AVDD) within the period of the signal 119. In certain embodiments, as shown by the waveform 811, the signal 711 has a duty cycle that is equal to $T_{on}$ divided by T, where T represents a period of the signal 711 and $T_{on}$ represents a time duration during which the signal 711 is at the predetermined reference voltage (e.g., $V_{ref1}$) within the period of the signal 711.

Figure 9:
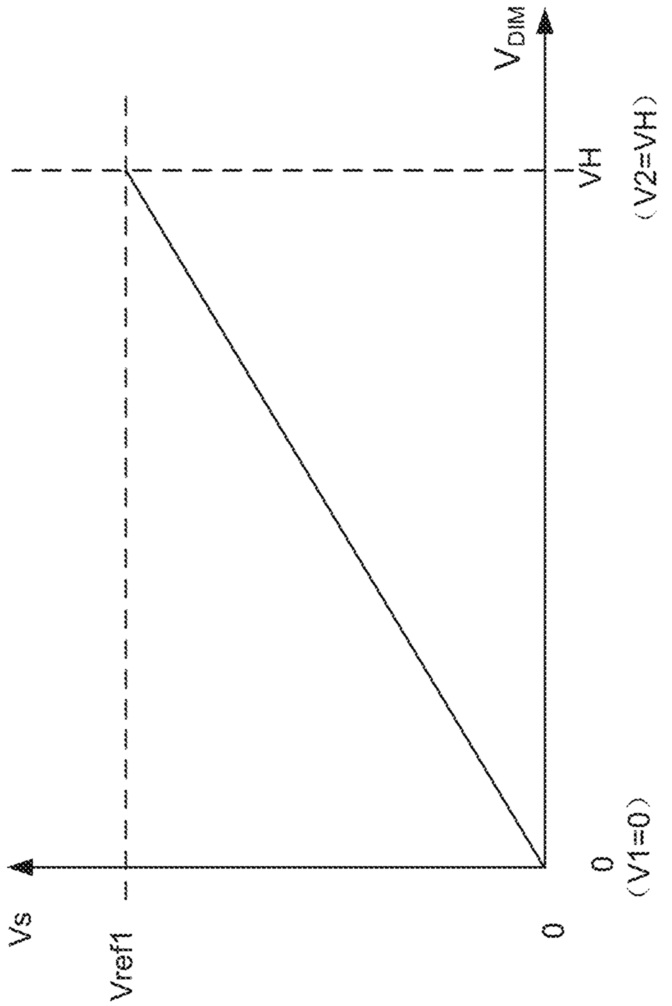
FIG. 9 shows a simplified diagram for the signal as a function of the magnitude of the analog voltage signal related to the gate controller as shown in FIG. 7 as part of the constant-current controller of the system for dimming control as shown in FIG. 1 according to certain embodiments of the present invention.

FIG. 9 shows a simplified diagram for the filtered signal 721 as a function of the magnitude of the analog voltage signal 113 related to the gate controller 150 as shown in FIG. 7 as part of the current controller 120 of the system 100 for dimming control as shown in FIG. 1 according to certain embodiments of the present invention. This diagram is merely an example, which should not unduly limit the scope of the claims. One of ordinary skill in the art would recognize many variations, alternatives, and modifications. For example, the magnitude (e.g., $V_{DIM}$) of the analog voltage signal 113 changes from the lower voltage limit 0 volts to the upper voltage limit $V_H$. As an example, the valley voltage level $V_1$ of the periodic signal 132 is equal to 0 volts, and the peak voltage level $V_2$ of the periodic signal 132 is equal to $V_H$.

As shown in FIG. 9, the filtered signal 721 (e.g., $V_S$) increases linearly with the increasing magnitude of the analog voltage signal 113 according to some embodiments. For example, if the magnitude (e.g., $V_{DIM}$) of the analog voltage signal 113 is equal to 0 volts, which is also equal to the valley voltage level $V_1$ of the periodic signal 132, the filtered signal 721 (e.g., $V_S$) is equal to 0 volts to Equation 3. As an example, if the magnitude (e.g., $V_{DIM}$) of the analog voltage signal 113 is equal to $V_H$, which is also equal to the peak voltage level $V_2$ of the periodic signal 132, the filtered signal 721 (e.g., $V_S$) is equal to the predetermined reference voltage $V_{ref1}$ according to Equation 3. In certain examples, when the magnitude (e.g., $V_{DIM}$) of the analog voltage signal 113 increases from 0 volts to $V_H$, the filtered signal 721 (e.g., $V_S$) increases from 0 volts to the predetermined reference voltage $V_{ref1}$ linearly as a function of the magnitude (e.g., $V_{DIM}$) of the analog voltage signal 113 according to Equation 3.

Figure 10:
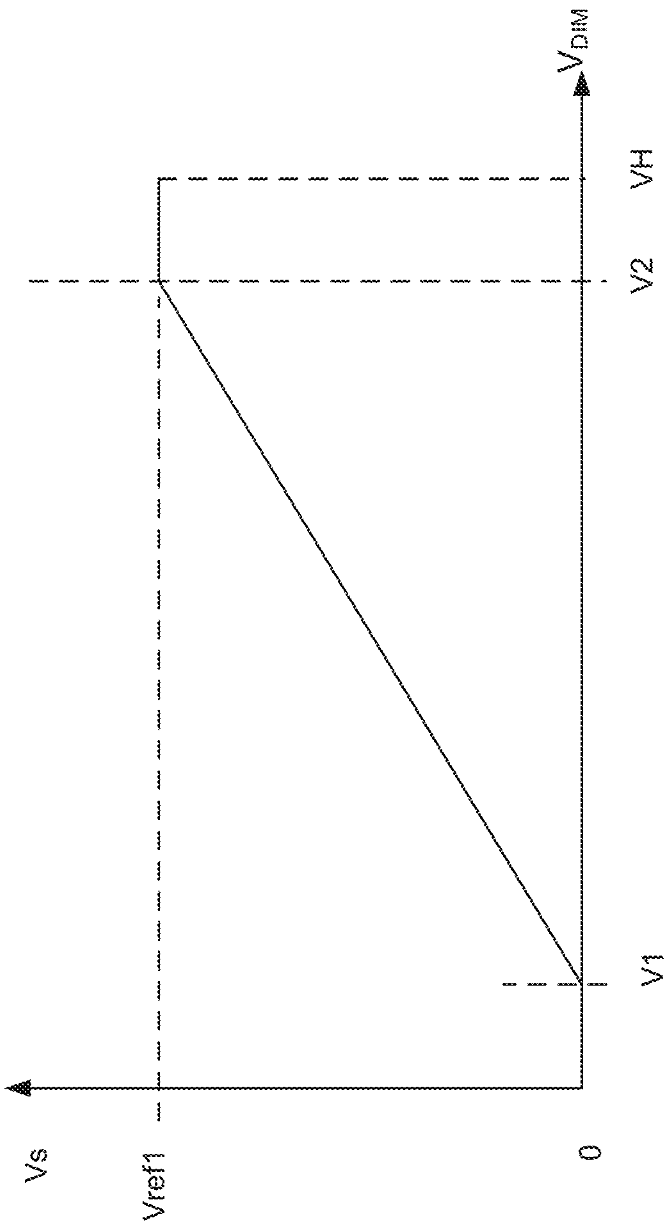
FIG. 10 shows a simplified diagram for the filtered signal as a function of the magnitude of the analog voltage signal related to the gate controller as shown in FIG. 7 as part of the constant-current controller of the system for dimming control as shown in FIG. 1 according to some embodiments of the present invention.

FIG. 10 shows a simplified diagram for the filtered signal 721 as a function of the magnitude of the analog voltage signal 113 related to the gate controller 150 as shown in FIG. 7 as part of the current controller 120 of the system 100 for dimming control as shown in FIG. 1 according to some embodiments of the present invention. This diagram is merely an example, which should not unduly limit the scope of the claims. One of ordinary skill in the art would recognize many variations, alternatives, and modifications. For example, the magnitude (e.g., $V_{DIM}$) of the analog voltage signal 113 changes from the lower voltage limit 0 volts to the upper voltage limit $V_H$. As an example, the valley voltage level $V_1$ of the periodic signal 132 is larger than 0 volts, and the peak voltage level $V_2$ of the periodic signal 132 is smaller than $V_H$.

For example, if the magnitude (e.g., $V_{DIM}$) of the analog voltage signal 113 is larger than or equal to 0 volts and smaller than or equal to the valley voltage level $V_1$ of the periodic signal 132, the filtered signal 721 (e.g., $V_S$) is equal to 0 volts. As an example, if the magnitude (e.g., $V_{DIM}$) of the analog voltage signal 113 is larger than or equal to the peak voltage level $V_2$ of the periodic signal 132 and smaller than or equal to $V_H$, the filtered signal 721 (e.g., $V_S$) is equal to the predetermined reference voltage $V_{ref1}$. As shown in FIG. 10, when the magnitude (e.g., $V_{DIM}$) of the analog voltage signal 113 increases from the valley voltage level $V_1$ to the peak voltage level $V_2$, the filtered signal 721 (e.g., $V_S$) increases from 0 volts to the predetermined reference voltage $V_{ref1}$ linearly as a function of the magnitude (e.g., $V_{DIM}$) of the analog voltage signal 113 according to certain embodiments.

Figure 11:
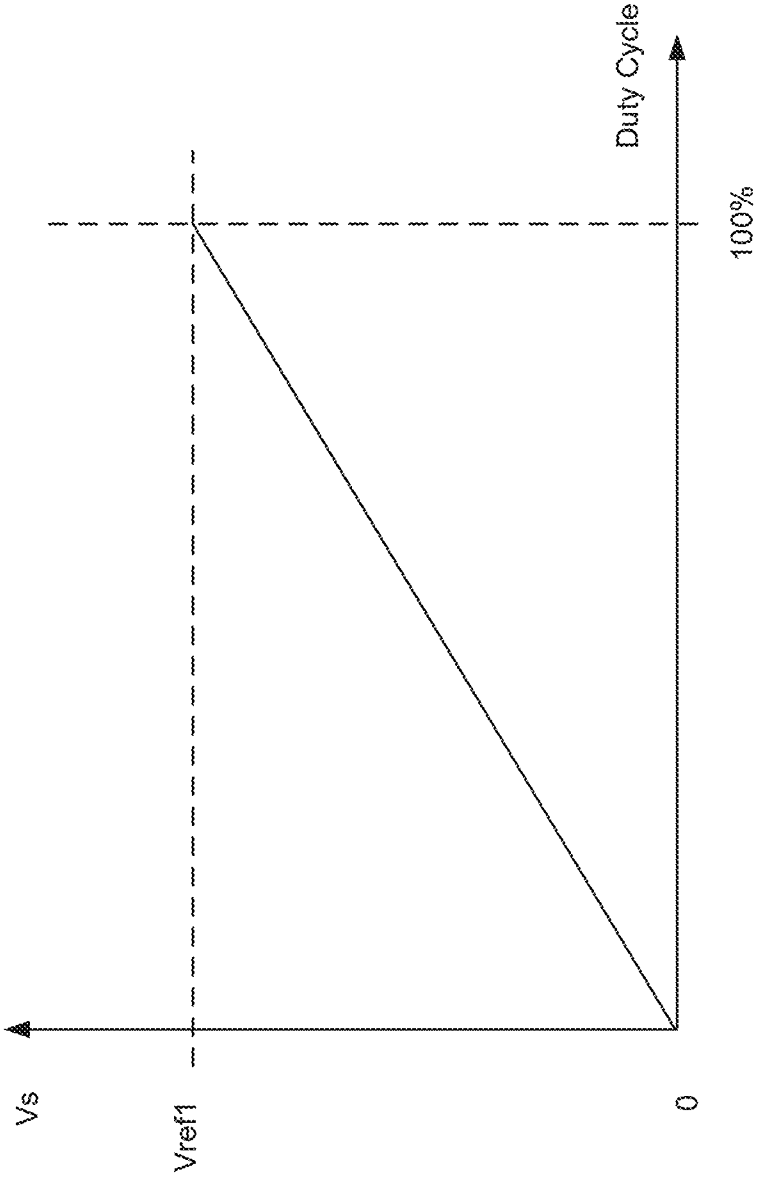
FIG. 11 shows a simplified diagram for the filtered signal as a function of the duty cycle of the pulse-width-modulation (PWM) signal related to the gate controller as shown in FIG. 7 as part of the constant-current controller of the system for dimming control as shown in FIG. 1 according to certain embodiments of the present invention.

FIG. 11 shows a simplified diagram for the filtered signal 721 as a function of the duty cycle of the pulse-width-modulation (PWM) signal 113 related to the gate controller 150 as shown in FIG. 7 as part of the current controller 120 of the system 100 for dimming control as shown in FIG. 1 according to certain embodiments of the present invention. This diagram is merely an example, which should not unduly limit the scope of the claims. One of ordinary skill in the art would recognize many variations, alternatives, and modifications.

In certain examples, the periodic signal 132 changes between a valley voltage level $V_1$ and a peak voltage level $V_2$, and the pulse-width-modulation (PWM) signal 113 changes from a low voltage level 0 volts to a high voltage level $V_O$. For example, the low voltage level 0 volts is smaller than the valley voltage level $V_1$. As an example, the high voltage level $V_O$ is larger than the peak voltage level $V_2$. In some examples, the duty cycle of the pulse-width-modulation (PWM) signal 113 changes between 0 and 1. For example, different magnitudes of the duty cycle for the pulse-width-modulation (PWM) signal 113 correspond to different magnitudes of the current 127 respectively.

As shown in FIG. 11, when the duty cycle of the pulse-width-modulation (PWM) signal 113 increases from 0 and 1, the filtered signal 721 (e.g., $V_S$) increases from 0 volts to the predetermined reference voltage $V_{ref1}$ linearly as a function of the duty cycle of the pulse-width-modulation (PWM) signal 113, according to some embodiments.

Figure 12:
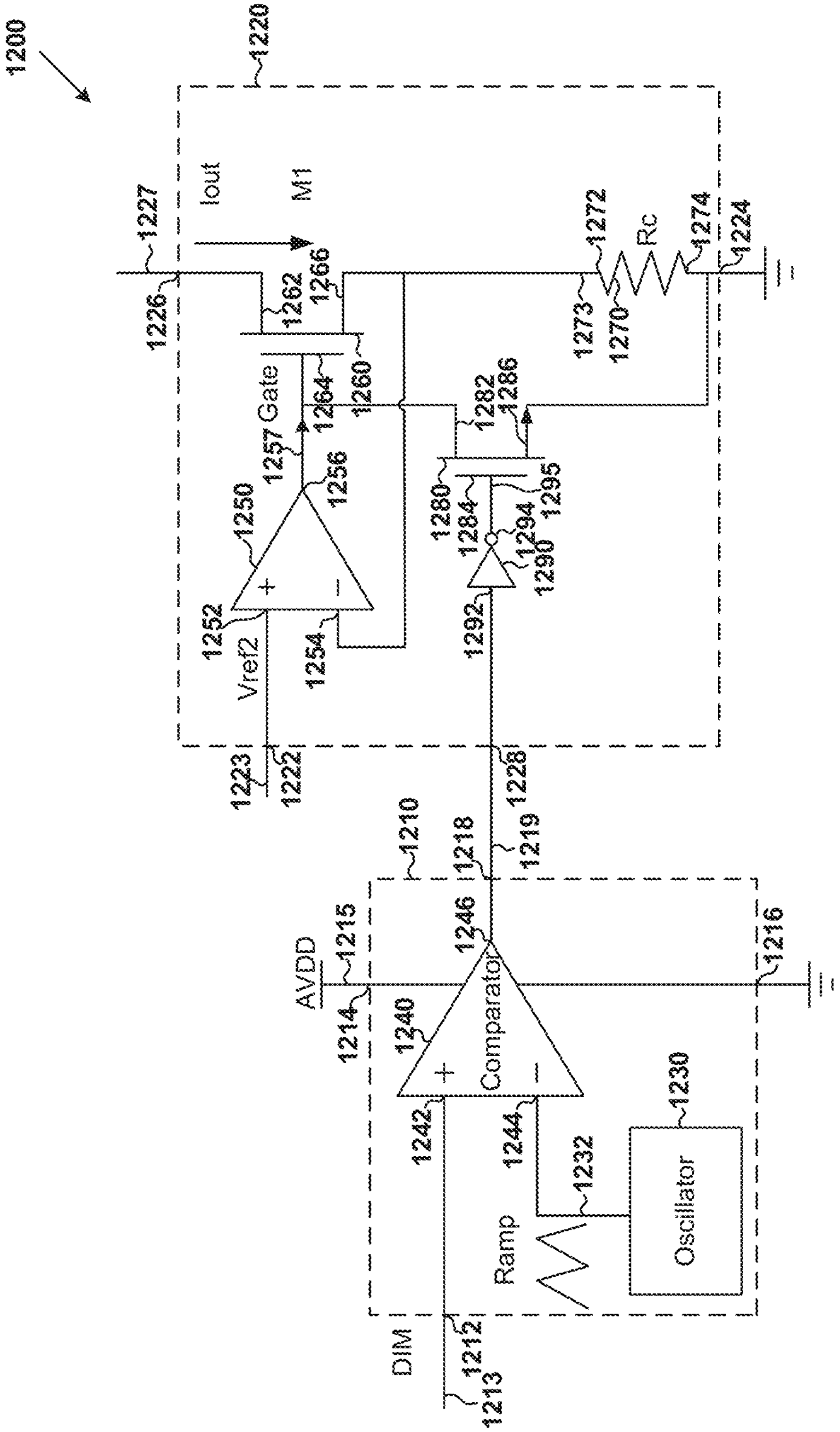
FIG. 12 is a simplified diagram showing a system for dimming control according to some embodiments of the present invention.

FIG. 12 is a simplified diagram showing a system for dimming control according to some embodiments of the present invention. This diagram is merely an example, which should not unduly limit the scope of the claims. One of ordinary skill in the art would recognize many variations, alternatives, and modifications. The system 1200 for dimming control includes a signal converter 1210 and a current controller 1220. For example, the signal converter 1210 includes an oscillator 1230 and a comparator 1240. As an example, the current controller 1220 (e.g., a constant-current controller) includes an operational amplifier 1250, a resistor 1270, transistors 1260 and 1280, and a NOT gate 1290. Although the above has been shown using a selected group of components for the system 1200 for dimming control, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 12, the signal converter 1210 includes terminals 1212, 1214, 1216 and 1218, and the current controller 1220 includes terminals 1222, 1224, 1226 and 1228 according to some embodiments. In certain examples, the terminal 1212 of the signal converter 1210 receives a dimming signal 1213, the terminal 1214 of the signal converter 1210 receives a supply voltage 1215, the terminal 1216 of the signal converter 1210 receives a ground voltage, and the terminal 1218 of the signal converter 1210 outputs a signal 1219. For example, the dimming signal 1213 is an analog voltage signal. As an example, the dimming signal 1213 is a pulse-width-modulation (PWM) signal (e.g., a logic signal). In some examples, the terminal 1228 of the current controller 1220 receives the signal 1219 from the terminal 1218 of the signal converter 1210, the terminal 1222 of the current controller 1220 receives a predetermined reference voltage 1223 (e.g., $V_{ref2}$), the terminal 1224 of the current controller 1220 is biased to the ground voltage, and the terminal 1226 of the current controller 1220 receives a current 1227 that flows through one or more light sources. For example, the one or more light sources include one or more incandescent lamps. As an example, the one or more light sources include one or more light-emitting-diode (LED) lamps.

In certain embodiments, the signal converter 1210 converts the dimming signal 1213 to the signal 1219. For example, the dimming signal 1213 is the analog voltage signal and/or the pulse-width-modulation (PWM) signal. As an example, the signal converter 1210 uses the dimming signal 1213 to determine the duty cycle of the signal 1219. For example, the signal converter 1210 includes the oscillator 1230 and the comparator 1240. In some examples, the oscillator 1230 generates a periodic signal 1232 (e.g., a periodic signal with a constant period $T_2$). For example, the periodic signal 1232 is a triangular-wave signal. As an example, the periodic signal 1232 is a sawtooth-wave signal. In certain examples, the comparator 1240 includes a non-inverting input terminal 1242 (e.g., the "+" terminal), an inverting input terminal 1244 (e.g., the "−" terminal), and an output terminal 1246. For example, the non-inverting input terminal 1242 (e.g., the "+" terminal) receives the dimming signal 1213, and the inverting input terminal 1244 (e.g., the "−" terminal) receives the periodic signal 1232 from the oscillator 1230.

In some embodiments, the comparator 1240 compares the dimming signal 1213 and the periodic signal 1232, generates the signal 1219 based at least in part on the dimming signal 1213 and the periodic signal 1232, and outputs the signal 1219 at the output terminal 1246. For example, regardless of whether the dimming signal 1213 is an analog voltage signal or a pulse-width-modulation (PWM) signal, if the dimming signal 1213 is larger than the periodic signal 1232, the signal 1219 is at a high voltage level. As an example, regardless of whether the dimming signal 1213 is an analog voltage signal or a pulse-width-modulation (PWM) signal, if the dimming signal 1213 is smaller than the periodic signal 1232, the signal 1219 is at a low voltage level. In certain examples, the signal 1219 changes from the high voltage level to the low voltage level and changes from the low voltage level to the high voltage level. For example, the high voltage level is equal to the supply voltage 1215 (e.g., AVDD) in magnitude, and the low voltage level is equal to the ground voltage (e.g., 0 volts) in magnitude. As an example, the high voltage level corresponds to a logic high level, and the low voltage level corresponds to a logic low level.

According to certain embodiments, the terminal 1228 of the current controller 1220 receives the signal 1219 from the terminal 1218 of the signal converter 1210. In some examples, the current controller 1220 uses a pulse-width-modulation mechanism, a pulse-frequency-modulation mechanism, and/or a liner control mechanism to control the magnitude of the current 1227 that flows through the one or more light sources. In certain examples, by controlling the magnitude of the current 1227, the current controller 1220 also controls the brightness of the one or more light sources. For example, the one or more light sources are one or more incandescent lamps, and the brightness of the one or more incandescent lamps corresponds to the analog voltage signal 1213. In certain examples, the one or more light sources are one or more light-emitting-diode (LED) lamps, and the brightness of the one or more light-emitting-diode (LED) lamps corresponds to the pulse-width-modulation (PWM) signal 1213.

According to some embodiments, the current controller 1220 includes the operational amplifier 1250, the resistor 1270, the transistors 1260 and 1280, and the NOT gate 1290. For example, the operational amplifier 1250 includes a non-inverting input terminal 1252 (e.g., the "+" terminal), an inverting input terminal 1254 (e.g., the "−" terminal), and an output terminal 1256. As an example, the transistor 1260 includes a drain terminal 1262, a gate terminal 1264, and a source terminal 1266, and the transistor 1280 includes a drain terminal 1282, a gate terminal 1284, and a source terminal 1286. For example, the NOT gate 1290 includes an input terminal 1292 and an output terminal 1294, and the resistor 1270 includes a terminal 1272 and a terminal 1274.

In some examples, the non-inverting input terminal 1252 (e.g., the "+" terminal) of the operational amplifier 1250 receives the predetermined reference voltage 1223 (e.g., $V_{ref2}$) through the terminal 1222 of the current controller 1220, the inverting input terminal 1254 (e.g., the "−" terminal) of the operational amplifier 1250 is connected to the source terminal 1266 of the transistor 1260 and the terminal 1272 of the resistor 1270, and the output terminal 1256 of the operational amplifier 1250 is connected to the gate terminal 1264 of the transistor 1260 and the drain terminal 1282 of the transistor 1280. For example, the drain terminal 1262 of the transistor 1260 receives the current 1227 through the terminal 1226 of the current controller 1220. As an example, the source terminal 1286 of the transistor 1280 and the terminal 1274 of the resistor 1270 are connected and biased to the ground voltage through the terminal 1224 of the current controller 1220. In certain examples, the NOT gate 1290 includes an input terminal 1292 and an output terminal 1294. For example, the input terminal 1292 of the NOT gate 1290 receives the signal 1219 through the terminal 1228 of the current controller 1220. As an example, the output terminal 1294 of the NOT gate 1290 is connected to the gate terminal 1284 of the transistor 1280.

In certain embodiments, the NOT gate 1290 generates a signal 1295 based at least in part on the signal 1219 and outputs the signal 1295 at the output terminal 1294. For example, if the signal 1219 is at the high voltage level, the signal 1295 is at a low voltage level corresponding to a logic low level. As an example, if the signal 1219 is at the low voltage level, the signal 1295 is at a high voltage level corresponding to a logic high level. In some examples, the signal 1295 is received by the gate terminal 1284 of the transistor 1280. For example, if the signal 1295 is at the low voltage level corresponding to the logic low level, the transistor 1280 is turned off. As an example, if the signal 1295 is at the high voltage level corresponding to the logic high level, the transistor 1280 is turned on.

In some embodiments, the gate terminal 1264 of the transistor 1260 is connected to the output terminal 1256 of the operational amplifier 1250 and the drain terminal 1282 of the transistor 1280. For example, if the transistor 1280 is turned on, with the source terminal 1286 of the transistor 1280 being biased to the ground voltage, the gate terminal 1264 of the transistor 1260 is at a low voltage level, causing the transistor 1260 to be turned off and the current 1227 to be equal to zero in magnitude. As an example, if the transistor 1280 is turned off, the gate terminal 1264 of the transistor 1260 receives a voltage signal 1257 that is generated by the operational amplifier 1250, and the voltage signal 1257 is used to control the current 1227 that flows through the one or more light sources.

According to certain embodiments, if the transistor 1280 is turned off, the voltage signal 1257 is used to control the current 1227 that flows through the one or more light sources. For example, when the transistor 1280 is turned on, if the voltage signal 1257 increases, the current 1227 also increases, and if the voltage signal 1257 decreases, the current 1227 also decreases. As an example, the resistor 1270 generates a sensing voltage 1273 that represents the magnitude of the current 1227, and the sensing voltage 1273 is received by the inverting input terminal 1254 (e.g., the "−" terminal) of the operational amplifier 1250.

According to some embodiments, the non-inverting input terminal 1252 (e.g., the "−" terminal) of the operational amplifier 1250 receives the predetermined reference voltage 1223 (e.g., $V_{ref2}$) through the terminal 1222 of the current controller 1220. For example, the voltage signal 1257 is generated by the operational amplifier 1250 based at least in part on the predetermined reference voltage 1223 (e.g., $V_{ref2}$) and the sensing voltage 1273. As example, if the transistor 1280 is turned on, the current 1227 that flows through the one or more light sources is equal to the predetermined reference voltage 1223 (e.g., $V_{ref2}$) divided by the resistance of the resistor 1270.

As shown in FIG. 12, when the signal 1219 is at the high voltage level, the current 1227 that flows through the one or more light sources is equal to the predetermined reference voltage 1223 (e.g., $V_{ref2}$) divided by the resistance of the resistor 1270, and when the signal 1219 is at the low voltage level, the current 1227 that flows through the one or more light sources is equal to zero according to certain embodiments. According to some embodiments, the average magnitude of the current 1227 is determined as follows:

$$I_{ave\_1227} = \frac{V_{ref2}}{R_{1270}} \times D_{1219} \quad \text{(Equation 5)}$$

where $I_{ave\_1227}$ represents the average magnitude of the current 1227. Additionally, $V_{ref2}$ represents the predetermined reference voltage 1223, and $R_{1270}$ represents the resistance of the resistor 1270. Also, $D_{1219}$ represents the duty cycle of the signal 1219. As an example, the current controller 1220 provides a one-to-one correspondence between the duty cycle of the signal 1219 and the average magnitude of the current 1227 that flows through the one or more light sources.

Figure 13:
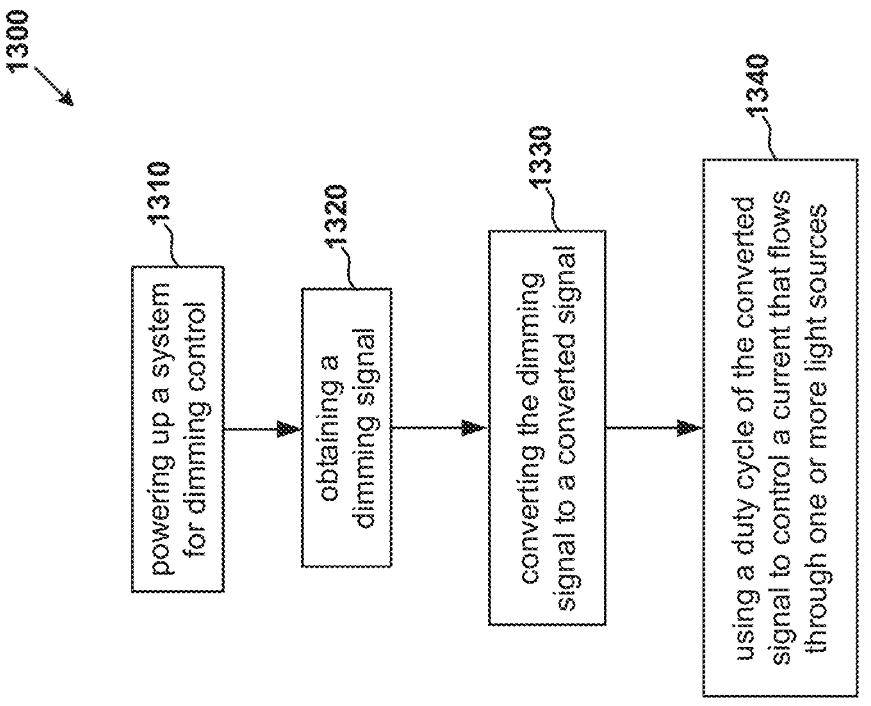
FIG. 13 is a simplified diagram showing a method for dimming control according to certain embodiments of the present invention.

FIG. 13 is a simplified diagram showing a method for dimming control according to certain embodiments of the present invention. This diagram is merely an example, which should not unduly limit the scope of the claims. One of ordinary skill in the art would recognize many variations, alternatives, and modifications. The method 1300 for dimming control includes a process 1310 for powering up a system for dimming control, a process 1320 for obtaining a dimming signal, a process 1330 for converting the dimming signal to a converted signal, and a process 1340 for using a duty cycle of the converted signal to control a current that flows through one or more light sources. Although the above has been shown using a selected group of processes for the method 1300 for dimming control, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present specification.

At the process 1310, a system for dimming control is powered up according to some embodiments. For example, the system for dimming control is the system 100 for dimming control, which is powered up by at least receiving the supply voltage 115 at the terminal 114 of the signal converter 110 as part of the system 100 for dimming control. As an example, the system for dimming control is the system 1200 for dimming control, which is powered up by at least receiving the supply voltage 1215 at the terminal 1214 of the signal converter 1210 as part of the system 1200 for dimming control.

At the process 1320, a dimming signal is obtained according to certain embodiments. For example, the dimming signal is an analog voltage signal. As an example, the dimming signal is a pulse-width-modulation (PWM) signal.

In some examples, the dimming signal 113 is received at the terminal 112 of the signal converter 110 as part of the system 100 for dimming control. In certain examples, the dimming signal 1213 is received at the terminal 1212 of the signal converter 1210 as part of the system 1200 for dimming control.

At the process 1330, the dimming signal is converted to a converted signal according to some embodiments. For example, the converted signal (e.g., the signal 119 and/or the signal 1219) changes between a high voltage level and a low voltage level. As an example, the duty cycle of the converted signal (e.g., the signal 119 and/or the signal 1219) is determined based at least in part on the dimming signal. In certain examples, if the dimming signal is an analog voltage signal, the duty cycle of the converted signal is determined by the magnitude of the analog voltage signal. In some examples, if the dimming signal is a pulse-width-modulation (PWM) signal, the duty cycle of the converted signal is determined by the duty cycle of the pulse-width-modulation (PWM) signal. For example, the dimming signal 113 is converted to the converted signal 119 by the signal converter 110 as part of the system 100 for dimming control. As an example, the dimming signal 1213 is converted to the converted signal 1219 by the signal converter 1210 as part of the system 1200 for dimming control.

At the process 1340, a duty cycle of the converted signal is used to control a current that flows through one or more light sources according to certain embodiments. For example, the duty cycle of the converted signal 119 is used by the current controller 120 as part of the system 100 for dimming control to control the magnitude of the current 127 that flows through the one or more light sources. As an example, the duty cycle of the converted signal 1219 is used by the current controller 1220 as part of the system 1200 for dimming control to control the magnitude of the current 1227 that flows through the one or more light sources.

Some embodiments of the present invention provide a system for dimming control (e.g., the system 100 for dimming control and/or the system 1200 for dimming control) that support multi-modes of a dimming signal (e.g., the dimming signal 113 and/or the dimming signal 1213). For example, the multi-modes of the dimming signal include one mode in which the dimming signal (e.g., the dimming signal 113 and/or the dimming signal 1213) is an analog voltage signal and another mode in which the dimming signal (e.g., the dimming signal 113 and/or the dimming signal 1213) is a pulse-width-modulation (PWM) signal. As an example, regardless of whether the dimming signal is an analog voltage signal or a pulse-width-modulation (PWM) signal, the system for dimming control (e.g., the system 100 for dimming control and/or the system 1200 for dimming control) generates a converted signal (e.g., the signal 119 and/or the signal 1219) based on at least information associated with the dimming signal.

Certain embodiments of the present invention provide a system for dimming control (e.g., the system 100 for dimming control and/or the system 1200 for dimming control) that converts a dimming signal (e.g., the dimming signal 113 and/or the dimming signal 1213) to a converted signal (e.g., the signal 119 and/or the signal 1219). For example, the system for dimming control (e.g., the system 100 for dimming control and/or the system 1200 for dimming control) determines the duty cycle of the converted signal (e.g., the signal 119 and/or the signal 1219) based at least in part on the dimming signal (e.g., the dimming signal 113 and/or the dimming signal 1213), regardless of whether the dimming signal (e.g., the dimming signal 113 and/or the dimming signal 1213) is an analog voltage signal or a pulse-width-modulation (PWM) signal. As an example, the system for dimming control (e.g., the system 100 for dimming control and/or the system 1200 for dimming control) uses the duty cycle of the converted signal (e.g., the signal 119 and/or the signal 1219) to control a current (e.g., the current 127 and/or the current 1227) that flows through the one or more light sources and also control the brightness of the one or more light sources.

Some embodiments of the present invention provide a system for dimming control (e.g., the system 100 for dimming control and/or the system 1200 for dimming control) that controls the brightness of one or more light sources regardless of whether a dimming signal (e.g., the dimming signal 113 and/or the dimming signal 1213) is an analog voltage signal or a pulse-width-modulation (PWM) signal. For example, the system for dimming control (e.g., the system 100 for dimming control and/or the system 1200 for dimming control) can handle both an analog voltage signal as the dimming signal (e.g., the dimming signal 113 and/or the dimming signal 1213) and a pulse-width-modulation (PWM) signal as the dimming signal (e.g., the dimming signal 113 and/or the dimming signal 1213). As an example, the system for dimming control (e.g., the system 100 for dimming control and/or the system 1200 for dimming control) reduces design complexity and/or system costs by supporting multi-modes of a dimming signal (e.g., the dimming signal 113 and/or the dimming signal 1213).

Certain embodiments of the present invention provide a system for dimming control (e.g., the system 100 for dimming control and/or the system 1200 for dimming control) that, regardless of whether a dimming signal (e.g., the dimming signal 113 and/or the dimming signal 1213) is an analog voltage signal or a pulse-width-modulation (PWM) signal, uses the same mechanism to convert the dimming signal to a converted signal (e.g., the signal 119 and/or the signal 1219). For example, regardless of whether the dimming signal (e.g., the dimming signal 113 and/or the dimming signal 1213) is an analog voltage signal or a pulse-width-modulation (PWM) signal, if the dimming signal (e.g., the dimming signal 113 and/or the dimming signal 1213) is larger than a periodic signal (e.g., the periodic signal 132 and/or the periodic signal 1232), the converted signal (e.g., the signal 119 and/or the signal 1219) is at a high voltage level. As an example, regardless of whether the dimming signal (e.g., the dimming signal 113 and/or the dimming signal 1213) is an analog voltage signal or a pulse-width-modulation (PWM) signal, if the dimming signal (e.g., the dimming signal 113 and/or the dimming signal 1213) is smaller than a periodic signal (e.g., the periodic signal 132 and/or the periodic signal 1232), the converted signal (e.g., the signal 119 and/or the signal 1219) is at a low voltage level.

Some embodiments of the present invention provide a system for dimming control (e.g., the system 100 for dimming control and/or the system 1200 for dimming control) that does not need to determine whether a dimming signal (e.g., the dimming signal 113 and/or the dimming signal 1213) is an analog voltage signal or a pulse-width-modulation (PWM) signal before converting the dimming signal (e.g., the dimming signal 113 and/or the dimming signal 1213) to a converted signal (e.g., the signal 119 and/or the signal 1219), because regardless of whether the dimming signal (e.g., the dimming signal 113 and/or the dimming signal 1213) is an analog voltage signal or a pulse-width-modulation (PWM) signal, the system for dimming control (e.g., the system 100 for dimming control and/or the system

1200 for dimming control) uses the same mechanism to convert the dimming signal (e.g., the dimming signal 113 and/or the dimming signal 1213) to the converted signal (e.g., the signal 119 and/or the signal 1219).

According to certain embodiments, a system for dimming control includes: a signal converter configured to receive a dimming signal and convert the dimming signal to a converted signal associated with a first duty cycle; and a current controller configured to receive the converted signal and determine a magnitude of a current that flows through one or more light sources based at least in part on the converted signal; wherein the signal converter is further configured to: receive an analog voltage signal as the dimming signal; and convert the analog voltage signal to the converted signal based at least in part on the analog voltage signal; wherein the signal converter is also further configured to: receive a pulse-width-modulation signal as the dimming signal; and convert the pulse-width-modulation signal to the converted signal based at least in part on the pulse-width-modulation signal; wherein the current controller is further configured to use the first duty cycle of the converted signal to determine the magnitude of the current that flows through the one or more light sources. For example, the system for dimming control is implemented according to at least FIG. 1 and/or FIG. 12.

As an example, the current controller is further configured to determine the magnitude of the current that flows through the one or more light sources to control a brightness of the one or more light sources. For example, the one or more light sources are one or more incandescent lamps; and the brightness of the one or more incandescent lamps corresponds to the analog voltage signal received by the signal converter as the dimming signal. As an example, the one or more light sources are one or more light-emitting-diode lamps; and the brightness of the one or more light-emitting-diode lamps corresponds to the pulse-width-modulation signal received by the signal converter as the dimming signal.

For example, the signal converter is further configured to: compare a reference signal and the dimming signal; and generate the converted signal based at least in part on the reference signal and the dimming signal. As an example, the signal converter is further configured to: compare the reference signal and the analog voltage signal as the dimming signal; generate the converted signal at a first voltage level if the analog voltage signal is larger than the reference signal in magnitude; and generate the converted signal at a second voltage level if the analog voltage signal is smaller than the reference signal in magnitude; wherein the first voltage level and the second voltage level are different. For example, the signal converter is further configured to: compare the reference signal and the pulse-width-modulation signal as the dimming signal; generate the converted signal at the first voltage level if the pulse-width-modulation signal is larger than the reference signal in magnitude; and generate the converted signal at the second voltage level if the pulse-width-modulation signal is smaller than the reference signal in magnitude. As an example, the first voltage level is larger than the second voltage level.

For example, the first voltage level is equal to a supply voltage in magnitude; and the second voltage level is equal to a ground voltage in magnitude. As an example, the current controller is further configured to: receive the converted signal changing between the supply voltage and the ground voltage in magnitude; and generate a first signal changing between a predetermined voltage and the ground voltage in magnitude based at least in part on the converted signal. For example, the predetermined voltage and the supply voltage are not equal in magnitude. As an example, the current controller is further configured to: if the converted signal is equal to the supply voltage in magnitude, generate the first signal equal to the predetermined voltage in magnitude; and if the converted signal is equal to the ground voltage in magnitude, generate the first signal equal to the ground voltage in magnitude.

For example, the reference signal is a periodic signal associated with a peak signal level and a valley signal level, the peak signal level being larger than the valley signal level. As an example, the signal converter is further configured to: receive the analog voltage signal as the dimming signal; if the analog voltage signal is equal to or smaller than the valley signal level in magnitude, set the first duty cycle of the converted signal equal to zero; and if the analog voltage signal is equal to or larger than the peak signal level in magnitude, set the first duty cycle of the converted signal equal to one. For example, the signal converter is further configured to, if the analog voltage signal is larger than the valley signal level and smaller than the peak signal level in magnitude, increase the first duty cycle of the converted signal if the analog voltage signal increases in magnitude. As an example, the signal converter is further configured to: receive the pulse-width-modulation signal as the dimming signal, the pulse-width-modulation signal being associated with a second duty cycle and changing between a third voltage level and a fourth voltage level, the third voltage level being larger than the fourth voltage level; and if the third voltage level of the pulse-width-modulation signal is larger than the peak signal level of the periodic signal and the fourth voltage level of the pulse-width-modulation signal is smaller than the valley signal level of the periodic signal, set the first duty cycle of the converted signal equal to the second duty cycle of the pulse-width-modulation signal.

According to some embodiments, a method for dimming control includes: receiving a dimming signal; converting the dimming signal to a converted signal associated with a first duty cycle; receiving the converted signal; and determining a magnitude of a current that flows through one or more light sources based at least in part on the converted signal; wherein the receiving a dimming signal and the converting the dimming signal to a converted signal include: receiving an analog voltage signal as the dimming signal; and converting the analog voltage signal to the converted signal based at least in part on the analog voltage signal; wherein the receiving a dimming signal and the converting the dimming signal to a converted signal include: receiving a pulse-width-modulation signal as the dimming signal; and converting the pulse-width-modulation signal to the converted signal based at least in part on the pulse-width-modulation signal; wherein the determining a magnitude of a current that flows through one or more light sources includes: using the first duty cycle of the converted signal to determine the magnitude of the current that flows through the one or more light sources. For example, the method for dimming control is implemented according to at least FIG. 1, FIG. 12, and/or FIG. 13.

As an example, the determining a magnitude of a current that flows through one or more light sources includes: controlling a brightness of the one or more light sources by at least determining the magnitude of the current that flows through the one or more light sources. For example, the one or more light sources are one or more incandescent lamps; and the brightness of the one or more incandescent lamps corresponds to the analog voltage signal received as the dimming signal. As an example, the one or more light sources are one or more light-emitting-diode lamps; and the brightness of the one or more light-emitting-diode lamps corresponds to the pulse-width-modulation signal received as the dimming signal. For example, the converting the dimming signal to a converted signal associated with a first duty cycle includes: comparing a reference signal and the dimming signal; and generating the converted signal based at least in part on the reference signal and the dimming signal. As an example, the converting the dimming signal to a converted signal associated with a first duty cycle includes: comparing the reference signal and the analog voltage signal as the dimming signal; generating the converted signal at a first voltage level if the analog voltage signal is larger than the reference signal in magnitude; and generating the converted signal at a second voltage level if the analog voltage signal is smaller than the reference signal in magnitude; wherein the first voltage level and the second voltage level are different. For example, the converting the dimming signal to a converted signal associated with a first duty cycle includes: comparing the reference signal and the pulse-width-modulation signal as the dimming signal; generating the converted signal at the first voltage level if the pulse-width-modulation signal is larger than the reference signal in magnitude; and generating the converted signal at the second voltage level if the pulse-width-modulation signal is smaller than the reference signal in magnitude. As an example, the first voltage level is larger than the second voltage level.

For example, the first voltage level is equal to a supply voltage in magnitude; and the second voltage level is equal to a ground voltage in magnitude. As an example, the receiving the converted signal includes: receiving the converted signal changing between the supply voltage and the ground voltage in magnitude; the determining a magnitude of a current that flows through one or more light sources includes: generating a first signal changing between a predetermined voltage and the ground voltage in magnitude based at least in part on the converted signal. For example, the predetermined voltage and the supply voltage are not equal in magnitude. As an example, the generating a first signal changing between a predetermined voltage and the ground voltage in magnitude includes: if the converted signal is equal to the supply voltage in magnitude, generating the first signal equal to the predetermined voltage in magnitude; and if the converted signal is equal to the ground voltage in magnitude, generating the first signal equal to the ground voltage in magnitude.

For example, the reference signal is a periodic signal associated with a peak signal level and a valley signal level, the peak signal level being larger than the valley signal level. As an example, the receiving a dimming signal and the converting the dimming signal to a converted signal include: receiving the analog voltage signal as the dimming signal; if the analog voltage signal is equal to or smaller than the valley signal level in magnitude, setting the first duty cycle of the converted signal equal to zero; and if the analog voltage signal is equal to or larger than the peak signal level in magnitude, setting the first duty cycle of the converted signal equal to one. For example, the converting the dimming signal to a converted signal includes: if the analog voltage signal is larger than the valley signal level and smaller than the peak signal level in magnitude, increasing the first duty cycle of the converted signal if the analog voltage signal increases in magnitude. As an example, the receiving a dimming signal and the converting the dimming signal to a converted signal include: receiving the pulse-width-modulation signal as the dimming signal, the pulse-width-modulation signal being associated with a second duty cycle and changing between a third voltage level and a fourth voltage level, the third voltage level being larger than the fourth voltage level; and if the third voltage level of the pulse-width-modulation signal is larger than the peak signal level of the periodic signal and the fourth voltage level of the pulse-width-modulation signal is smaller than the valley signal level of the periodic signal, setting the first duty cycle of the converted signal equal to the second duty cycle of the pulse-width-modulation signal.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for dimming control, the system comprising:

a signal converter configured to receive a dimming signal and convert the dimming signal to a converted signal associated with a first duty cycle; and a current controller configured to receive the converted signal and determine a magnitude of a current that flows through one or more light sources based at least in part on the converted signal;

wherein the signal converter is further configured to:

in response to the dimming signal being an analog voltage signal, convert the analog voltage signal to the converted signal based at least in part on the analog voltage signal;

wherein the signal converter is also further configured to:

in response to the dimming signal being a pulse-width-modulation signal associated with a second duty cycle, convert the pulse-width-modulation signal to the converted signal based at least in part on the pulse-width-modulation signal;

wherein the current controller is further configured to use the first duty cycle of the converted signal to determine the magnitude of the current that flows through the one or more light sources.

2. The system of claim 1 wherein the current controller is further configured to determine the magnitude of the current that flows through the one or more light sources to control a brightness of the one or more light sources.

3. The system of claim 2 wherein:

the one or more light sources are one or more incandescent lamps; and the brightness of the one or more incandescent lamps corresponds to the analog voltage signal received by the signal converter as the dimming signal.

4. The system of claim 2 wherein:

the one or more light sources are one or more light-emitting-diode lamps; and the brightness of the one or more light-emitting-diode lamps corresponds to the pulse-width-modulation signal received by the signal converter as the dimming signal.

5. The system of claim 1 wherein the signal converter is further configured to:

compare a reference signal and the dimming signal; and generate the converted signal based at least in part on the reference signal and the dimming signal.

6. The system of claim 5 wherein the signal converter is further configured to:

compare the reference signal and the analog voltage signal as the dimming signal;

generate the converted signal at a first voltage level if the analog voltage signal is larger than the reference signal in magnitude; and generate the converted signal at a second voltage level if the analog voltage signal is smaller than the reference signal in magnitude;

wherein the first voltage level and the second voltage level are different.

7. The system of claim 6 wherein the signal converter is further configured to:

compare the reference signal and the pulse-width-modulation signal as the dimming signal;

generate the converted signal at the first voltage level if the pulse-width-modulation signal is larger than the reference signal in magnitude; and generate the converted signal at the second voltage level if the pulse-width-modulation signal is smaller than the reference signal in magnitude.

8. The system of claim 7 wherein the first voltage level is larger than the second voltage level.

9. The system of claim 8 wherein:

the first voltage level is equal to a supply voltage in magnitude; and the second voltage level is equal to a ground voltage in magnitude.

10. The system of claim 9 wherein the current controller is further configured to:

receive the converted signal changing between the supply voltage and the ground voltage in magnitude; and generate a first signal changing between a predetermined voltage and the ground voltage in magnitude based at least in part on the converted signal.

11. The system of claim 10 wherein the predetermined voltage and the supply voltage are not equal in magnitude.

12. The system of claim 10 wherein the current controller is further configured to:

if the converted signal is equal to the supply voltage in magnitude, generate the first signal equal to the predetermined voltage in magnitude; and if the converted signal is equal to the ground voltage in magnitude, generate the first signal equal to the ground voltage in magnitude.

13. The system of claim 5 wherein the reference signal is a periodic signal associated with a peak signal level and a valley signal level, the peak signal level being larger than the valley signal level.

14. The system of claim 13 wherein the signal converter is further configured to:

receive the analog voltage signal as the dimming signal;

if the analog voltage signal is equal to or smaller than the valley signal level in magnitude, set the first duty cycle of the converted signal equal to zero; and if the analog voltage signal is equal to or larger than the peak signal level in magnitude, set the first duty cycle of the converted signal equal to one.

15. The system of claim 14 wherein the signal converter is further configured to, if the analog voltage signal is larger than the valley signal level and smaller than the peak signal level in magnitude, increase the first duty cycle of the converted signal if the analog voltage signal increases in magnitude.

16. The system of claim 12 wherein:

the pulse-width-modulation signal changes between a third voltage level and a fourth voltage level, and the third voltage level is larger than the fourth voltage level; and the signal converter is further configured to:

if the third voltage level of the pulse-width-modulation signal is larger than the peak signal level of the periodic signal and the fourth voltage level of the pulse-width-modulation signal is smaller than the valley signal level of the periodic signal, set the first duty cycle of the converted signal equal to the second duty cycle of the pulse-width-modulation signal.

17. A method for dimming control, the method comprising:

receiving a dimming signal;

converting the dimming signal to a converted signal associated with a first duty cycle;

receiving the converted signal; and determining a magnitude of a current that flows through one or more light sources based at least in part on the converted signal;

wherein the receiving a dimming signal and the converting the dimming signal to a converted signal include:

in response to the dimming signal being an analog voltage signal, converting the analog voltage signal to the converted signal based at least in part on the analog voltage signal;

wherein the receiving a dimming signal and the converting the dimming signal to a converted signal include:

in response to the dimming signal being a pulse-width-modulation signal associated with a second duty cycle, converting the pulse-width-modulation signal to the converted signal based at least in part on the pulse-width-modulation signal;

wherein the determining a magnitude of a current that flows through one or more light sources includes:

using the first duty cycle of the converted signal to determine the magnitude of the current that flows through the one or more light sources.

18. The method of claim 17 wherein the determining a magnitude of a current that flows through one or more light sources includes:

controlling a brightness of the one or more light sources by at least determining the magnitude of the current that flows through the one or more light sources.

19. The method of claim 18 wherein:

the one or more light sources are one or more incandescent lamps; and the brightness of the one or more incandescent lamps corresponds to the analog voltage signal received as the dimming signal.

20. The method of claim 18 wherein:

the one or more light sources are one or more light-emitting-diode lamps; and the brightness of the one or more light-emitting-diode lamps corresponds to the pulse-width-modulation signal received as the dimming signal.

21. The method of claim 17 wherein the converting the dimming signal to the converted signal associated with the first duty cycle includes:

comparing a reference signal and the dimming signal; and generating the converted signal based at least in part on the reference signal and the dimming signal.

22. The method of claim 21 wherein the converting the dimming signal to the converted signal associated with the first duty cycle includes:

comparing the reference signal and the analog voltage signal as the dimming signal;

generating the converted signal at a first voltage level if the analog voltage signal is larger than the reference signal in magnitude; and generating the converted signal at a second voltage level if the analog voltage signal is smaller than the reference signal in magnitude;

wherein the first voltage level and the second voltage level are different.

23. The method of claim 22 wherein the converting the dimming signal to the converted signal associated with the first duty cycle includes:

comparing the reference signal and the pulse-width-modulation signal as the dimming signal;

generating the converted signal at the first voltage level if the pulse-width-modulation signal is larger than the reference signal in magnitude; and generating the converted signal at the second voltage level if the pulse-width-modulation signal is smaller than the reference signal in magnitude.

24. The method of claim 23 wherein the first voltage level is larger than the second voltage level.

25. The method of claim 24 wherein:

the first voltage level is equal to a supply voltage in magnitude; and the second voltage level is equal to a ground voltage in magnitude.

26. The method of claim 25 wherein:

the receiving the converted signal includes:

receiving the converted signal changing between the supply voltage and the ground voltage in magnitude;

the determining a magnitude of a current that flows through one or more light sources includes:

generating a first signal changing between a predetermined voltage and the ground voltage in magnitude based at least in part on the converted signal.

27. The method of claim 26 wherein the predetermined voltage and the supply voltage are not equal in magnitude.

28. The method of claim 26 wherein the generating a first signal changing between a predetermined voltage and the ground voltage in magnitude includes:

if the converted signal is equal to the supply voltage in magnitude, generating the first signal equal to the predetermined voltage in magnitude; and if the converted signal is equal to the ground voltage in magnitude, generating the first signal equal to the ground voltage in magnitude.

29. The method of claim 21 wherein the reference signal is a periodic signal associated with a peak signal level and a valley signal level, the peak signal level being larger than the valley signal level.

30. The method of claim 29 wherein the receiving a dimming signal and the converting the dimming signal to a converted signal include:

receiving the analog voltage signal as the dimming signal;

if the analog voltage signal is equal to or smaller than the valley signal level in magnitude, setting the first duty cycle of the converted signal equal to zero; and if the analog voltage signal is equal to or larger than the peak signal level in magnitude, setting the first duty cycle of the converted signal equal to one.

31. The method of claim 30 wherein the converting the dimming signal to a converted signal includes:

if the analog voltage signal is larger than the valley signal level and smaller than the peak signal level in magnitude, increasing the first duty cycle of the converted signal if the analog voltage signal increases in magnitude.

32. The method of claim 28 wherein:

the pulse-width-modulation signal changes between a third voltage level and a fourth voltage level, and the third voltage level is larger than the fourth voltage level; and the receiving a dimming signal and the converting the dimming signal to a converted signal further include:

if the third voltage level of the pulse-width-modulation signal is larger than the peak signal level of the periodic signal and the fourth voltage level of the pulse-width-modulation signal is smaller than the valley signal level of the periodic signal, setting the first duty cycle of the converted signal equal to the second duty cycle of the pulse-width-modulation signal.

* * * * *